United States Patent
Matias et al.

(10) Patent No.: US 10,748,577 B2
(45) Date of Patent: *Aug. 18, 2020

(54) SYSTEM AND METHOD OF GENERATING VIDEO FROM VIDEO CLIPS BASED ON MOMENTS OF INTEREST WITHIN THE VIDEO CLIPS

(71) Applicant: GoPro, Inc., San Mateo, CA (US)

(72) Inventors: Joven Matias, Encinitas, CA (US); Ha Phan, Solana Beach, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,866

(22) Filed: Dec. 21, 2018

(65) Prior Publication Data

US 2019/0122699 A1   Apr. 25, 2019

Related U.S. Application Data

(63) Continuation of application No. 15/627,055, filed on Jun. 19, 2017, now Pat. No. 10,186,298, which is a continuation of application No. 14/918,321, filed on Oct. 20, 2015, now Pat. No. 9,721,611.

(51) Int. Cl.
| | | |
|---|---|---|
| *G11B 27/00* | (2006.01) | |
| *H04N 5/93* | (2006.01) | |
| *G11B 27/031* | (2006.01) | |
| *G11B 27/34* | (2006.01) | |

(Continued)

(52) U.S. Cl.
CPC ........ *G11B 27/031* (2013.01); *G06K 9/00718* (2013.01); *G06K 9/00751* (2013.01); *G06K 9/00758* (2013.01); *G11B 27/3081* (2013.01); *G11B 27/34* (2013.01)

(58) Field of Classification Search
USPC .................................................. 386/278–287
See application file for complete search history.

(56) References Cited

U.S. PATENT DOCUMENTS

| | | |
|---|---|---|
| 5,130,794 A | 7/1992 | Ritchey |
| 6,337,683 B1 | 1/2002 | Gilbert |
| 6,593,956 B1 | 7/2003 | Potts |

(Continued)

FOREIGN PATENT DOCUMENTS

| | | |
|---|---|---|
| WO | 2001020466 | 3/2001 |
| WO | 2009040538 A1 | 4/2009 |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

(Continued)

*Primary Examiner* — Nigar Chowdhury
(74) *Attorney, Agent, or Firm* — Esplin & Associates, PC

(57) ABSTRACT

Videos may be automatically generated using a set of video clip. Individual moments of interest may be identified within individual video clips of a set of video clips. A moment of interest may correspond to a point in time within a video clip. The point in time may be associated with one or more values of one or more attributes of the video clip. Individual moments of interest may be associated with individual portions of a video. The video may be generated using the set of video clips based on the associations.

20 Claims, 6 Drawing Sheets

(51) Int. Cl.
*G06K 9/00* (2006.01)
*G11B 27/30* (2006.01)

(56) References Cited

U.S. PATENT DOCUMENTS

| | | | |
|---|---|---|---|
| 7,222,356 B1 | 5/2007 | Yonezawa | |
| 7,483,618 B1 | 1/2009 | Edwards | |
| 8,446,433 B1 | 5/2013 | Mallet | |
| 8,539,359 B2* | 9/2013 | Rapaport | G06Q 10/10 715/751 |
| 8,611,422 B1 | 12/2013 | Yagnik | |
| 8,718,447 B2 | 5/2014 | Yang | |
| 8,730,299 B1 | 5/2014 | Kozko | |
| 8,763,023 B1 | 6/2014 | Goetz | |
| 8,910,046 B2 | 12/2014 | Matsuda | |
| 8,988,509 B1 | 3/2015 | Macmillan | |
| 9,032,299 B2 | 5/2015 | Lyons | |
| 9,036,001 B2 | 5/2015 | Chuang | |
| 9,077,956 B1 | 7/2015 | Morgan | |
| 9,111,579 B2 | 8/2015 | Meaney | |
| 9,142,253 B2 | 9/2015 | Ubillos | |
| 9,151,933 B2 | 10/2015 | Sato | |
| 9,204,039 B2 | 12/2015 | He | |
| 9,208,821 B2 | 12/2015 | Evans | |
| 9,245,582 B2 | 1/2016 | Shore | |
| 9,253,533 B1 | 2/2016 | Morgan | |
| 9,317,172 B2 | 4/2016 | Lyons | |
| 9,423,944 B2 | 8/2016 | Eppolito | |
| 9,473,758 B1 | 10/2016 | Long | |
| 9,479,697 B2 | 10/2016 | Aguilar | |
| 9,564,173 B2 | 2/2017 | Swenson | |
| 9,615,061 B2* | 4/2017 | Carney | H04N 5/44543 |
| 2004/0128317 A1 | 7/2004 | Sull | |
| 2005/0025454 A1 | 2/2005 | Nakamura | |
| 2006/0062363 A1* | 3/2006 | Albrett | H04N 21/4383 379/101.01 |
| 2006/0122842 A1 | 6/2006 | Herberger | |
| 2007/0173296 A1 | 7/2007 | Hara | |
| 2007/0204310 A1 | 8/2007 | Hua | |
| 2007/0230461 A1 | 10/2007 | Singh | |
| 2008/0044155 A1 | 2/2008 | Kuspa | |
| 2008/0123976 A1 | 5/2008 | Coombs | |
| 2008/0152297 A1 | 6/2008 | Ubillos | |
| 2008/0163283 A1 | 7/2008 | Tan | |
| 2008/0177706 A1 | 7/2008 | Yuen | |
| 2008/0208791 A1 | 8/2008 | Das | |
| 2008/0253735 A1 | 10/2008 | Kuspa | |
| 2008/0313541 A1 | 12/2008 | Shafton | |
| 2009/0213270 A1 | 8/2009 | Ismert | |
| 2009/0274339 A9 | 11/2009 | Cohen | |
| 2009/0327856 A1 | 12/2009 | Mouilleseaux | |
| 2010/0045773 A1 | 2/2010 | Ritchey | |
| 2010/0064219 A1 | 3/2010 | Gabrisko | |
| 2010/0086216 A1 | 4/2010 | Lee | |
| 2010/0104261 A1 | 4/2010 | Liu | |
| 2010/0183280 A1 | 7/2010 | Beauregard | |
| 2010/0231730 A1 | 9/2010 | Ichikawa | |
| 2010/0245626 A1 | 9/2010 | Woycechowsky | |
| 2010/0251295 A1 | 9/2010 | Amento | |
| 2010/0278504 A1 | 11/2010 | Lyons | |
| 2010/0278509 A1 | 11/2010 | Nagano | |
| 2010/0281375 A1 | 11/2010 | Pendergast | |
| 2010/0281386 A1 | 11/2010 | Lyons | |
| 2010/0287476 A1 | 11/2010 | Sakai | |
| 2010/0299630 A1 | 11/2010 | McCutchen | |
| 2010/0318660 A1 | 12/2010 | Balsubramanian | |
| 2010/0321471 A1 | 12/2010 | Casolara | |
| 2011/0025847 A1 | 2/2011 | Park | |
| 2011/0069148 A1 | 3/2011 | Jones | |
| 2011/0069189 A1 | 3/2011 | Venkataraman | |
| 2011/0075990 A1 | 3/2011 | Eyer | |
| 2011/0093798 A1 | 4/2011 | Shahraray | |
| 2011/0134240 A1 | 6/2011 | Anderson | |
| 2011/0173565 A1 | 7/2011 | Ofek | |
| 2011/0206351 A1 | 8/2011 | Givoly | |
| 2011/0211040 A1 | 9/2011 | Lindemann | |
| 2011/0258049 A1 | 10/2011 | Ramer | |
| 2011/0293250 A1 | 12/2011 | Deever | |
| 2011/0320322 A1 | 12/2011 | Roslak | |
| 2012/0014673 A1 | 1/2012 | O'Dwyer | |
| 2012/0027381 A1 | 2/2012 | Kataoka | |
| 2012/0030029 A1 | 2/2012 | Flinn | |
| 2012/0057852 A1 | 3/2012 | Devleeschouwer | |
| 2012/0081530 A1* | 4/2012 | Kerr | G11B 27/034 348/61 |
| 2012/0123780 A1 | 5/2012 | Gao | |
| 2012/0127169 A1 | 5/2012 | Barcay | |
| 2012/0166940 A1* | 6/2012 | Ennis | G06F 40/131 715/255 |
| 2012/0206565 A1 | 8/2012 | Villmer | |
| 2012/0311448 A1 | 12/2012 | Achour | |
| 2013/0024805 A1 | 1/2013 | In | |
| 2013/0044108 A1 | 2/2013 | Tanaka | |
| 2013/0058532 A1 | 3/2013 | White | |
| 2013/0063561 A1 | 3/2013 | Stephan | |
| 2013/0078990 A1 | 3/2013 | Kim | |
| 2013/0127636 A1 | 5/2013 | Aryanpur | |
| 2013/0136193 A1 | 5/2013 | Hwang | |
| 2013/0142384 A1 | 6/2013 | Ofek | |
| 2013/0151970 A1 | 6/2013 | Achour | |
| 2013/0166303 A1 | 6/2013 | Chang | |
| 2013/0191743 A1 | 7/2013 | Reid | |
| 2013/0195429 A1 | 8/2013 | Fay | |
| 2013/0197967 A1 | 8/2013 | Pinto | |
| 2013/0208134 A1 | 8/2013 | Hamalainen | |
| 2013/0208942 A1 | 8/2013 | Davis | |
| 2013/0215220 A1 | 8/2013 | Wang | |
| 2013/0259399 A1 | 10/2013 | Ho | |
| 2013/0263002 A1 | 10/2013 | Park | |
| 2013/0283301 A1 | 10/2013 | Avedissian | |
| 2013/0287214 A1 | 10/2013 | Resch | |
| 2013/0287304 A1 | 10/2013 | Kimura | |
| 2013/0300939 A1 | 11/2013 | Chou | |
| 2013/0308921 A1 | 11/2013 | Budzinski | |
| 2013/0318443 A1 | 11/2013 | Bachman | |
| 2013/0343727 A1 | 12/2013 | Rav-Acha | |
| 2014/0026156 A1 | 1/2014 | Deephanphongs | |
| 2014/0064706 A1 | 3/2014 | Lewis, II | |
| 2014/0072285 A1 | 3/2014 | Shynar | |
| 2014/0093164 A1 | 4/2014 | Noorkami | |
| 2014/0096002 A1 | 4/2014 | Dey | |
| 2014/0105573 A1 | 4/2014 | Hanckmann | |
| 2014/0161351 A1 | 6/2014 | Yagnik | |
| 2014/0165119 A1 | 6/2014 | Liu | |
| 2014/0169766 A1 | 6/2014 | Yu | |
| 2014/0176542 A1 | 6/2014 | Shohara | |
| 2014/0193040 A1 | 7/2014 | Bronshtein | |
| 2014/0212107 A1 | 7/2014 | Saint-Jean | |
| 2014/0219634 A1 | 8/2014 | McIntosh | |
| 2014/0226953 A1 | 8/2014 | Hou | |
| 2014/0232818 A1 | 8/2014 | Carr | |
| 2014/0232819 A1 | 8/2014 | Armstrong | |
| 2014/0245336 A1 | 8/2014 | Lewis, II | |
| 2014/0300644 A1 | 10/2014 | Gillard | |
| 2014/0328570 A1 | 11/2014 | Cheng | |
| 2014/0341528 A1 | 11/2014 | Mahate | |
| 2014/0366052 A1 | 12/2014 | Ives | |
| 2014/0376876 A1 | 12/2014 | Bentley | |
| 2015/0015680 A1 | 1/2015 | Wang | |
| 2015/0022355 A1 | 1/2015 | Pham | |
| 2015/0029089 A1 | 1/2015 | Kim | |
| 2015/0058709 A1 | 2/2015 | Zaletel | |
| 2015/0085111 A1 | 3/2015 | Lavery | |
| 2015/0154452 A1 | 6/2015 | Bentley | |
| 2015/0178915 A1 | 6/2015 | Chatterjee | |
| 2015/0186073 A1 | 7/2015 | Pacurariu | |
| 2015/0220504 A1 | 8/2015 | Bocanegra Alvarez | |
| 2015/0254871 A1 | 9/2015 | Macmillan | |
| 2015/0256746 A1 | 9/2015 | Macmillan | |
| 2015/0256808 A1 | 9/2015 | Macmillan | |
| 2015/0271483 A1 | 9/2015 | Sun | |
| 2015/0287435 A1 | 10/2015 | Land | |
| 2015/0294141 A1 | 10/2015 | Molyneux | |

(56) References Cited

U.S. PATENT DOCUMENTS

| | | | |
|---|---|---|---|
| 2015/0296242 A1* | 10/2015 | Khalil | H04N 21/4781 725/25 |
| 2015/0318020 A1 | 11/2015 | Pribula | |
| 2015/0339324 A1 | 11/2015 | Westmoreland | |
| 2015/0375117 A1 | 12/2015 | Thompson | |
| 2015/0382083 A1 | 12/2015 | Chen | |
| 2016/0005435 A1 | 1/2016 | Campbell | |
| 2016/0005440 A1 | 1/2016 | Gower | |
| 2016/0026874 A1 | 1/2016 | Hodulik | |
| 2016/0027470 A1 | 1/2016 | Newman | |
| 2016/0027475 A1 | 1/2016 | Hodulik | |
| 2016/0029105 A1 | 1/2016 | Newman | |
| 2016/0055885 A1 | 2/2016 | Hodulik | |
| 2016/0088287 A1 | 3/2016 | Sadi | |
| 2016/0098941 A1 | 4/2016 | Kerluke | |
| 2016/0119551 A1 | 4/2016 | Brown | |
| 2016/0217325 A1 | 7/2016 | Bose | |
| 2016/0225405 A1 | 8/2016 | Matias | |
| 2016/0225410 A1 | 8/2016 | Lee | |
| 2016/0234345 A1 | 8/2016 | Roberts | |
| 2016/0358603 A1 | 12/2016 | Azam | |
| 2016/0366330 A1 | 12/2016 | Boliek | |
| 2017/0006214 A1 | 1/2017 | Andreassen | |

OTHER PUBLICATIONS

FFmpeg, "Demuxing," Doxygen, Dec. 5, 2014, 15 pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 pages, [online] [retrieved on Jul. 13, 2015] Retrieved from the internet <URL: https://www.ffmpeg.org/doxyg en/2. 3/structA VP a ck et. html>.

Han et al., 'Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015,12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015,12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 7 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 Pages.

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights via Robust Recurrent Auto-encoders' arXiv:1510.01442v1 [cs.CV] Oct. 6, 2015 (9 pgs).

PCT International Search Report for PCT/US17/16367 dated Apr. 14, 2017 (2 pages).

Ernoult, Emeric, 'How to Triple Your YouTube Video Views with Facebook', SocialMediaExaminer.com, Nov. 26, 2012, 16 pages.

Ricker, 'First Click: TomTom's Bandit camera beats GoPro with software' Mar. 9,2016 URL: http://www.theverge. com/2016/3/9/11179298/tomtom-bandit-beats-gopro (6 pages).

PCT International Search Report and Written Opinion for PCT/US15/18538, dated Jun. 16, 2015, 26 pages.

PCT International Search Reort for PCT/US15/18538 dated Jun. 16, 2015 (2 pages).

\* cited by examiner

SYSTEM AND METHOD OF GENERATING VIDEO FROM VIDEO CLIPS BASED ON MOMENTS OF INTEREST WITHIN THE VIDEO CLIPS

FIELD OF THE DISCLOSURE

This disclosure relates to generating video from video clips based on one or more moments of interest within individual ones of the video clips.

BACKGROUND

Digital cameras are increasingly used to capture images of their surroundings. The images can be video clips, including a series of single image frames that can be manipulated further to provide effects such as slow motion type effects. The video files also can include audio.

Captured video clips may be editable, for example, in post capture editing processes. However, editing can be cumbersome, resource intensive, and time consuming. For example, users require post editing software that requires the user to review and evaluate each captured video clips to select portions that are relevant and/or remove portions that are irrelevant. Moreover, if particular affects are desired, those must be selected and applied to desired portions of individual video clips.

In addition, editing typically is individualized. Each user individually edits their video clips to output what they so desire.

SUMMARY

One aspect of the disclosure relates to a system configured for generating videos from video clips based on one or more moments of interest within individual ones of the video clips. The system may be configured to achieve automatic video generation that may be the same or substantially same as a video generated by an individual user carrying out conventional, and tedious, post capture editing operations.

In some implementations, the system may include one or more physical processors configured by machine-readable instructions. Executing the machine-readable instructions may cause the one or more physical processors to facilitate generating videos from video clips based on one or more moments of interest within individual ones of the video clips. The machine-readable instructions may include one or more of a user component, a user interface component, a moment of interest component, a video component, a distribution component, and/or other components.

The user component may be configured to access and/or manage user accounts associated with users of the system. The user accounts may include user information associated with users of the user accounts. The user account may include a first user account associated with a first user. User information may include one or more of information identifying users, security login information, system usage information, external usage information, subscription information, user preference information, a computing platform identification associated with a user, a phone number associated with a user, privacy settings information, and/or other information related to users.

The user interface component may be configured to effectuate presentation of user interfaces at computing platforms associated with the users. A user interface may be configured to facilitate one or more of registering for user accounts; accessing user accounts; providing user information for a user account; uploading video clips, videos, and/or other information; generating, editing, collaborating on, and/or distributing videos and/or video clip; and/or performing one or more other operations.

The moment of interest component may be configured to identify one or more moments of interest within individual video clips of a set of video clips for generating a video. By way of non-limiting example, the set of video clips may comprise a first video clip, a second video clip, and/or other video clips. A first moment of interest may be identified within the first video clip. The first moment of interest may correspond to a first point in time within the first video clip. The first point in time may be associated with the first video clip having a first value of a first attribute. A second moment of interest may be identified within the second video clip. The second moment of interest may correspond to a second point in time within the second video clip. The second point in time may be associated with the second video clip having a second value of a second attribute.

The video component may be configured to associate individual moments of interest with individual portions of the video. By way of non-limiting example, the associations may include a first association of the first moment of interest with a first portion of the video, a second association of the second moment of interest with a second portion of the video, and/or other associations.

The video component may be configured to generate the video using the set of video clips based on the associations. By way of non-limiting example, the video may be generated using the first video clip based on the first association, the second video clip based on the second association, and/or other video clips based on other associations.

The distribution component may be configured to distribute videos according to instructions from a user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
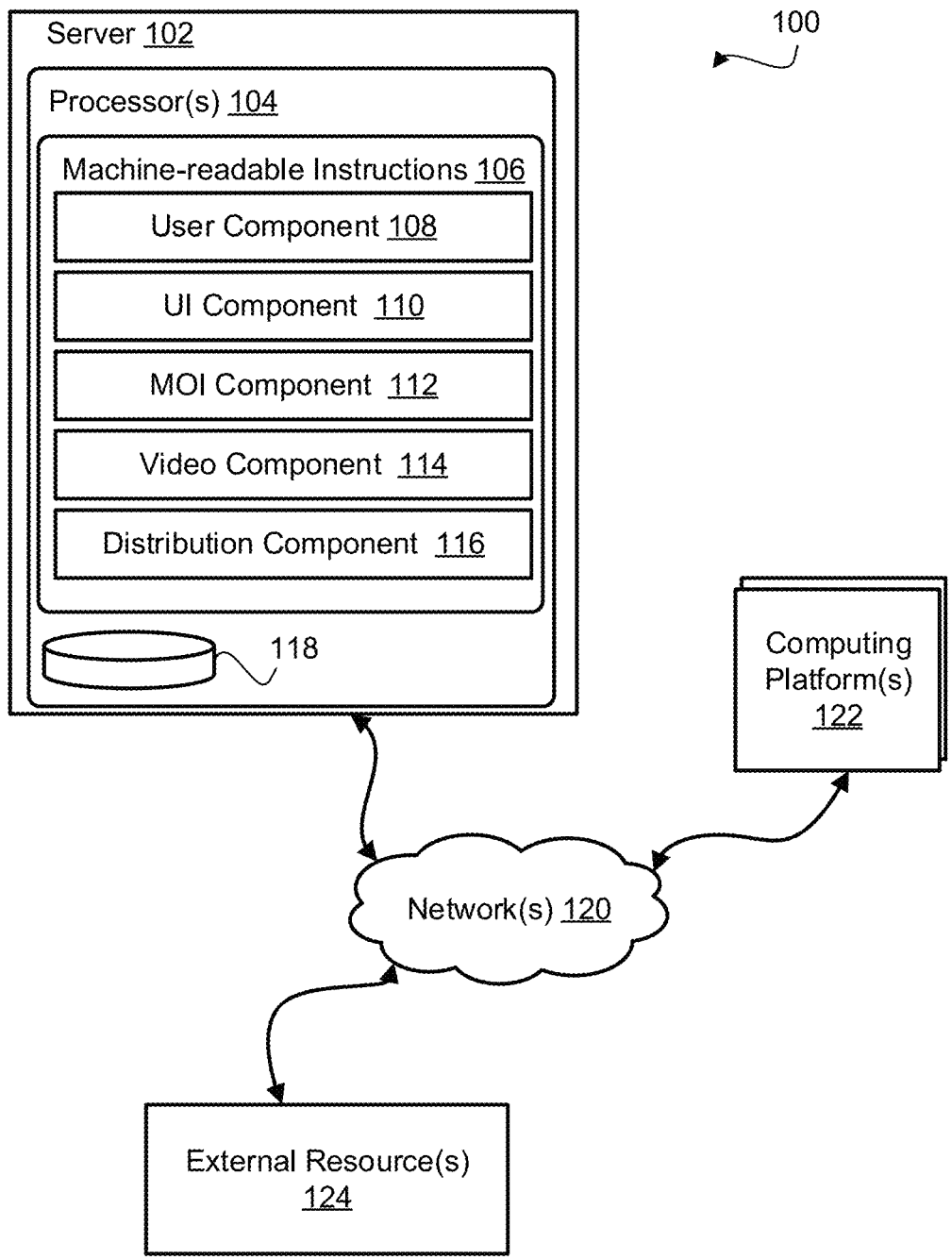
FIG. 1 illustrates a system configured for generating videos from video clips based on one or more moments of interest within individual ones of the video clips, in accordance with one or more implementations.

FIG. 1 illustrates a system 100 configured for generating video from video clips based on one or more moments of interest within individual ones of the video clips. In some implementations, system 100 may be configured to facilitate an automatic generation of a video from a set of video clips associated with a user based on one or more moments of interest within individual ones of the video clips. The system 100 may be configured to achieve automatic video generation. The video may be generated in manner that may be the same or substantially same as a video generated by an individual user carrying out conventional post capture editing operations. The system 100 may be configured to allow the user to edit the video during generation of the video and/or subsequent to the automatic generation of the video.

The system 100 may comprise one or more of a server 102, one or more computing platforms 122, and/or other components. Individual computing platforms 122 may include one or more of a cellular telephone, a smartphone, a digital camera, a laptop, a tablet computer, a desktop computer, a television set-top box, smart TV, a gaming console, a client computing platform, and/or other platforms.

The server 102 may include one or more physical processors 104 configured by machine-readable instructions 106. Executing the machine-readable instructions 106 may cause the one or more physical processors 104 to facilitate generating videos from video clips based on one or more moments of interest within individual ones of the video clips. The machine-readable instructions 106 may include one or more of a user component 108, a user interface component 110 (abbreviated "UI Component 110" in FIG. 1), a moment of interest component 112 (abbreviated "MOI Component 112" in FIG. 1), a video component 114, a distribution component 116, and/or other components.

One or more features and/or functions of server 102 may be configured to facilitate generation, editing, and/or distribution of videos. It is noted that although the present disclosure is directed to videos and/or video clips, one or more other implementations of system 100 and/or server 102 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items. In some implementations, photos may be associated with one or more of multi-shot photo modes, time-lapse modes, and/or burst shot modes of a camera.

Users of system 100 may comprise individuals and/or entities that provide, generate, edit, and/or distribute one or more of videos, video clips, and/or other media items. Individual videos may comprise a compilation of video clips. A given video may be a story-based video. By way of non-limiting example, system 100 may be configured to receive video clips (or video segments) captured by users. System 100 may be configured to generate a video based on a story theme. The story theme may be automatically determined based on user preference, a specification by a user, and/or determined based on other criteria. A story theme may define one or more of a story line, a topic, and/or a plot that outlines a video. The story theme may correspond to a set of rules, described in more detail herein. By way of non-limiting example, a set of rules may be associated with a storyboard that may be used to convey a story theme. The system 100 may apply the rules to a set of video clips associated with a user and automatically edit individual video clips to generate a video. By way of non-limiting example, a theme may be an action theme, a comedic theme, a dramatic theme, and/or other themes.

One or more components of system 100 may be configured to determine user preferences to generate personalized story-based videos for users. In some implementations, user preferences may be determined from one or more of system usage (e.g., user activities within system 100), usage of one or more applications external to system 100 (e.g., online activities such as in social networks and/or other external applications), user entry and/or selection of preferences, and/or by other techniques. In some implementations, user preferences may correspond to one or more of a theme preference, a moment of interest preference, supplemental audio preference, and/or other preferences.

By way of non-limiting example, users may capture videos and/or video clips using one or more image capturing devices. An image capturing device may include one or more of a computing platform 122, a mobile device (e.g., a smart phone, a tablet, and/or other mobile device), a camera (e.g., an action camera, a sports camera, and/or other type of camera), a video recorder, and/or other device suitable to capture, upload, edit, and/or distribute videos and/or video clips. To simplify and clarify the present description, image capture devices may be referred to generally as "cameras," however it is to be understood that this is not to be considered limiting as other types of image capture devices may be employed. A given camera may include one or more sensors including one or more a GPS, gyro, compass, accelerometer, temperature sensor, pressure sensor, depth sensor, an image sensor (e.g., an electromagnetic transducer), a sound transducer, and/or other sensors.

In some implementations, server 102 may be configured to provide remote hosting of the features and/or functions of server 102 to one or more computing platforms 122. The one or more computing platforms 122 may be remotely located from the server 102. In some implementations, one or more features and/or functions of server 102 may be attributed as local features and/or functions of one or more computing platforms 122. By way of non-limiting example, individual ones of computing platforms 122 may include machine-readable instructions comprising the same or similar components as machine-readable instructions 106 of server 102. The computing platforms 122 may be configured to locally execute one or more components that may be the same or similar to the components of machine-readable instructions 106.

By way of non-limiting example, one or more features and/or functions attributed to server 102 may be provided at a client-end application that may be installed on a computing platform 122. In some implementations, one or more features and/or functions attributed to server 102 may be configured as a cloud-based application that a user may access via computing platform 122. In some implementations, an application providing one or more features and/or functions attributed herein to server 102 may be configured to be part client-end and part cloud based. Further, it is noted that the one or more computing platforms, servers, and/or other machines executing a client-based application and/or a cloud-based application may comprise one or more of one or more processors, memory storage configured to store and/or execute program code corresponding to the processes described herein, and/or other components.

In FIG. 1, user component 108 may be configured to access and/or manage user accounts associated with users of system 100. The user accounts may include user information associated with users of the user accounts. User information may include information stored by server(s) 102 (e.g., electronic storage 118), one or more of computing platforms 122, and/or other storage locations.

User information may include one or more of information identifying users (e.g., a username or handle, a number, an identifier, and/or other identifying information), security login information (e.g., a login code or password, a user ID, and/or other information necessary for the user to access server 102), system usage information, external usage information (e.g., usage of one or more applications external to system 100 including one or more of online activities such as in social networks and/or other external applications), subscription information, preference information, a computing platform identification associated with a user, a phone number associated with a user, privacy settings information, and/or other information related to users.

The user component 108 may be configured to obtain user information via user input at a user interface (e.g., facilitated by user interface component 110 and/or other components of machine-readable instructions 106). A user interface may be configured to allow a user to register for services provided by the sever 102 and/or provide other information to user component 108. For example, a user may register to receive services provided by server 102 via a website, web-based application, mobile application, and/or user application providing a user interface for interaction with user component 108. A user may register by activating a user application of server 102 and/or creating an account thereafter. In some implementations, the user application may be preinstalled on a computing platform 122 and/or integrated with firmware of a computing platform 122.

The user component 108 may be configured to create a user ID and/or other identifying information for a user when the user registers. The user component 108 may be configured to associate the user ID and/or other identifying information with one or more computing platforms 122 used by the user. The user component 108 may be configured to store such association in the user account of the user. A user may further associate one or more accounts associated with social network services, messaging services, and the like with an account provided by server 102.

In some implementations, user component 108 may be configured to manage video clips associated with users. By way of non-limiting example, a user may upload video clips (e.g., via a user interface displayed on a computing platform associated with the user). Video clips uploaded by users may be stored in a user data store and/or other storage location that may be accessible by user component 108. The user data store may comprise, for example, at least part of electronic storage 118 and/or other storage device configured to store videos and/or video clips.

In some implementations, user component 108 may be configured to access and/or manage video clips captured by a user via access to a removable storage device that may store video clips. By way of non-limiting example, a user may insert a removable storage device of a camera into a corresponding drive of a computing platform 122 to provide access to the information stored on the removable storage device. In some implementations, video clips may be uploaded and/or stored simultaneously while being captured.

The user component 108 may be configured to determine user preference information, and/or other information. Preference information for a user may include one or more preferences related to video clips, videos, and/or other media items. In some implementations, preference information may define user preferences with respect to values of attributes of video clips, videos, and/or other media items.

An individual attribute of a video and/or video clip may include one or more of a geo-location attribute, a time attribute, a feature point detection attribute, setting information attribute, a motion attribute, and/or other attributes.

In some implementations, a value of a geolocation attribute may correspond to one or more of a compass heading, one or more real world locations of where a video and/or video clip was captured, a pressure at the one or more real world locations, a depth at the one or more real world locations, a temperature at the one or more real world location, and/or other information. For example, a given value of a geolocation attribute may include one or more of a physical location where a video clip and/or part of the video clip was captured, sensor output from a pressure sensor, sensor output from a compass, sensor output from a depth sensor, and/or other information.

A value of a geolocation attribute may be determined based on one or more of geo-stamping, geotagging, user entry and/or selection, output from one or more sensors, and/or other techniques. By way of non-limiting example, a camera may include one or more components and/or sensors configured to provide one or more of a geo-stamp of a geolocation of a video clip prior to, during, and/or post capture of a video clip, output related to ambient pressure, output related to depth, output related to compass headings, output related to ambient temperature, and/or other information. For example, a GPS of a camera may automatically geo-stamp a geolocation where a video clip is captured. In some implementations, users may provide values of geolocation attribute based on user entry and/or selection of geolocations prior to, during, and/or post capture of the video clips.

In some implementations, a value of a time attribute may correspond to a one or more timestamps associated with a video and/or video clip. For example, a given value of a time attribute may include date and/or time associated with capture of a video clip and/or part of the video clip, and/or other information.

A value of a time attribute may be determined based on timestamping, user entry and/or selection of dates and/or times, and/or other techniques. By way of non-limiting example, a camera may include an internal clock that may be configured to timestamp a video clip prior to, during, and/or post capture of a video clip. In some implementations, users may provide values of time attribute based on user entry and/or selection of dates and/or time prior to, during, and/or post capture of the video clips.

In some implementations, a value of a feature point detection attribute may correspond to one or more of a feature point, an object, an action, and/or other information portrayed within a video and/or video clip. For example, a given value of a feature point detection attribute may include a particular feature, object, and/or an action portrayed in a video clip.

A value of feature point detection attribute may be determined based on one or more feature, object, action, and/or composition detection techniques. Such techniques may include one or more of SURF, SIFT, bounding box parameterization, facial recognition, visual interest analysis, composition analysis (e.g., corresponding to photography standards such as rule of thirds and/or other photography standards), audio segmentation, visual similarity, scene change, motion tracking, and/or other techniques. In some implementations feature point detection may facilitate determining one or more of feature points, objects, actions, compositions, and/or other information depicted in a video clip, and/or other information. A feature point may comprise a single point on an image. An object may correspond to one or more of a static object, a moving object, a particular actor, a particular face, and/or objects. Actions detected may include one or more of sport related actions, inactions, motions of object, and/or other actions. A composition may correspond to information determined from composition analysis and/or other techniques. For example, information determined from composition analysis may convey occurrences of photography standards such as the rule of thirds, and/or other photograph standards.

By way of non-limiting illustration, a sport related action may include surfing. Surfing action may be detectable based on one or more objects and/or movements of objects that convey the act of surfing. By way of non-limiting example, object detections conveying a surfing action may correspond to one or more of a wave shaped object, a human shaped object standing on a surfboard shaped object, and/or other detections.

In some implementations, a value of a setting information attribute may correspond to one or more cinematic settings of a video and/or video clip. Cinematic settings may correspond to one or more cinematography effects set by a user and/or camera when capturing a video clip. For example, cinematography effects may include one or more of a camera perspective, camera mounting position, shot framing, shot filter, lighting arrangement, a shot transition, a frame rate, a resolution, shutter speed, and/or other cinematic settings.

A value of a setting information attribute may be determined based on one or more of feature point and/or object detection techniques, output from one or more camera sensors, predetermined settings of a camera, settings established by a user prior to, during, and/or after capture, and/or other techniques. By way of non-limiting example, predetermined settings of a camera may include one or more of on a frame rate, resolution, shutter speed, field of view, time lapse interval, low light mode, photo Mode, white balance, color, ISO, sharpness, exposure, and/or other settings. By way of non-limiting example, feature point and/or object detection techniques may facilitate determine one or more of a camera perspective, camera mounting position, shot framing, and/or other information. In some implementations, a camera may be in communication a mobile phone application and/or a 3rd party device which may facilitate user selection of camera settings.

In some implementations, a value of a motion attribute may correspond to motion of a camera during capture of a video and/or video clip. A value of a motion attribute may be determined based on one or more of output from an accelerometer, output from a gyro, and/or other information.

It is noted that the above description of attributes and/or their values is provided for illustrative purpose only and is not to be considered limiting. For example, other attributes and/or attribute values may be considered within the context of information associated with video and/or video clips.

The user component 108 may be configured such that user preference information may be determined based on one or more of system usage information, external usage information, entry and/or selection by the users, and/or other information.

System usage information may be determined based on monitoring current user interaction with system 100 and/or analyzing past user activity with system 100 to learn a user's use pattern. The user's use pattern may be used to infer user preferences. System usage information may be determined based on monitoring user interaction with one or more features and/or functions provided by server 102, computing platforms 122, and/or other entities within system 100. By way of non-limiting example, monitoring user interaction may include monitoring one or more of videos and/or video clips a user views, video clips a user uploads, videos a user generates, videos and/or video clips a user up-votes (or down-votes), video clips and/or videos that include one or more user-initiated identifications of moments of interest, and/or other user interactions.

In some implementations, determining user preference based on video clips a user uploads may comprise determining one or more values of one or more attributes of the uploaded video clips, and/or other operations. Determining user preference may be based an amount of uploaded video clips having similar values of one or more attributes meeting and/or exceeding a threshold amount. By way of non-limiting example, once an amount of uploaded videos commonly sharing values of one or more attributes meets or exceeds a threshold amount, it may be inferred that the user prefers the commonly shared values of the one or more attributes. Determining user preferences may comprise associating one or more user preferences with one or more of the commonly shared values of the one or more attributes, and/or other operations.

In some implementations, determining user preference based on videos a user generates may comprise determining values of one or more attributes of the videos, and/or other operations. Determining user preference may be based an amount of generated videos having commonly shared values of one or more attributes meeting and/or exceeding a threshold amount. By way of non-limiting example, once an amount of generated videos that commonly share values of one or more attributes meets or exceeds the threshold amount, it may be inferred that the user prefers the commonly shared values of the one or more attributes. Determining user preferences may comprise associating one or more user preferences with one or more of the commonly shared values of the one or more attributes, and/or other operations.

In some implementations, monitoring user interaction may include monitoring videos and/or video clips a user up-votes and/or down-votes. Individual videos and/or video clips may be presented to a user in a user interface that may include one or more user interface elements facilitating up-vote and/or down-vote selections. Determining user preferences may comprise determining an amount of videos and/or video clips of which a user has up-voted which commonly share values of one or more attributes, and/or other operations. Determining user preference may further comprise determining whether the amount of up-voted videos and/or video clips meets or exceeds a threshold amount. Determining user preferences may further comprise, responsive to determining that an amount of up-voted videos and/or video clips which commonly share values of one or more attributes has met or exceeded a threshold amount, associating one or more user preferences with the commonly shared values of the one or more attributes, and/or other operations.

In some implementations, a threshold amount may be determined based on one or more of a system-wide basis, individually by user, and/or other techniques. By way of non-limiting example, a threshold amount with which user preference may be inferred may be predetermined for one or more users to be in the range of 1-10, 5-15, and/or other ranges and/or amounts. It is noted that the above ranges are provided for illustrative purposes only and are not to be considered limiting. For example, in some implementations, threshold amounts may comprise values outside of these particular ranges which may be suitable to infer preference.

In some implementations, user-initiated identifications of moments of interest within a video clip may be provided by a user during one or both of capture of the video clip and/or post capture of the video clip (e.g., during editing and/or other post capture times). A moment of interest may correspond to a point in time and/or frame within a video clip. In some implementations, individual points in time may correspond to individual frames of the video clip. A user-initiated identification of a moment of interest within a video clip may correspond to a point in time that may be of particular interest and/or preference to the user. The point in time may be associated with the video clip having one or more values of one or more attributes. For example, a point in time within a video clip may be associated with a first attribute of the video clip having a first value. By way of non-limiting illustration, a point in time may be associated with an action portrayed in the video clip that defines a value of a feature point detection attribute of the video clip. For example, the action may be a surfing maneuver in the video clip that defines a value of a feature point detection attribute of the video clip such that the value is the particular surfing maneuver.

In some implementations, users may initiate identifications of moments of interest during capture of a video clip via one or more features and/or functions of a camera used to capture the video clip. By way of non-limiting example, a camera may include a physical interface (e.g., a button) that may allow a user to identify a moment of interest in a video clip currently being captured by the user. Identification may facilitate providing a highlight of the moment of interest during one or both of playback of the video clip and/or editing of the video clip. A highlight may include an indication provided to the user to make the user aware of the moment of interest. An indication may include one or more of a visual indication, an audible indication, and/or other indications that may be provided to the user. An indication may be provided during one or both playback and/or editing of the video clip to make the user aware of the moment of interest. User-initiated identifications of moments of interest may be provided in other ways.

Figure 3:
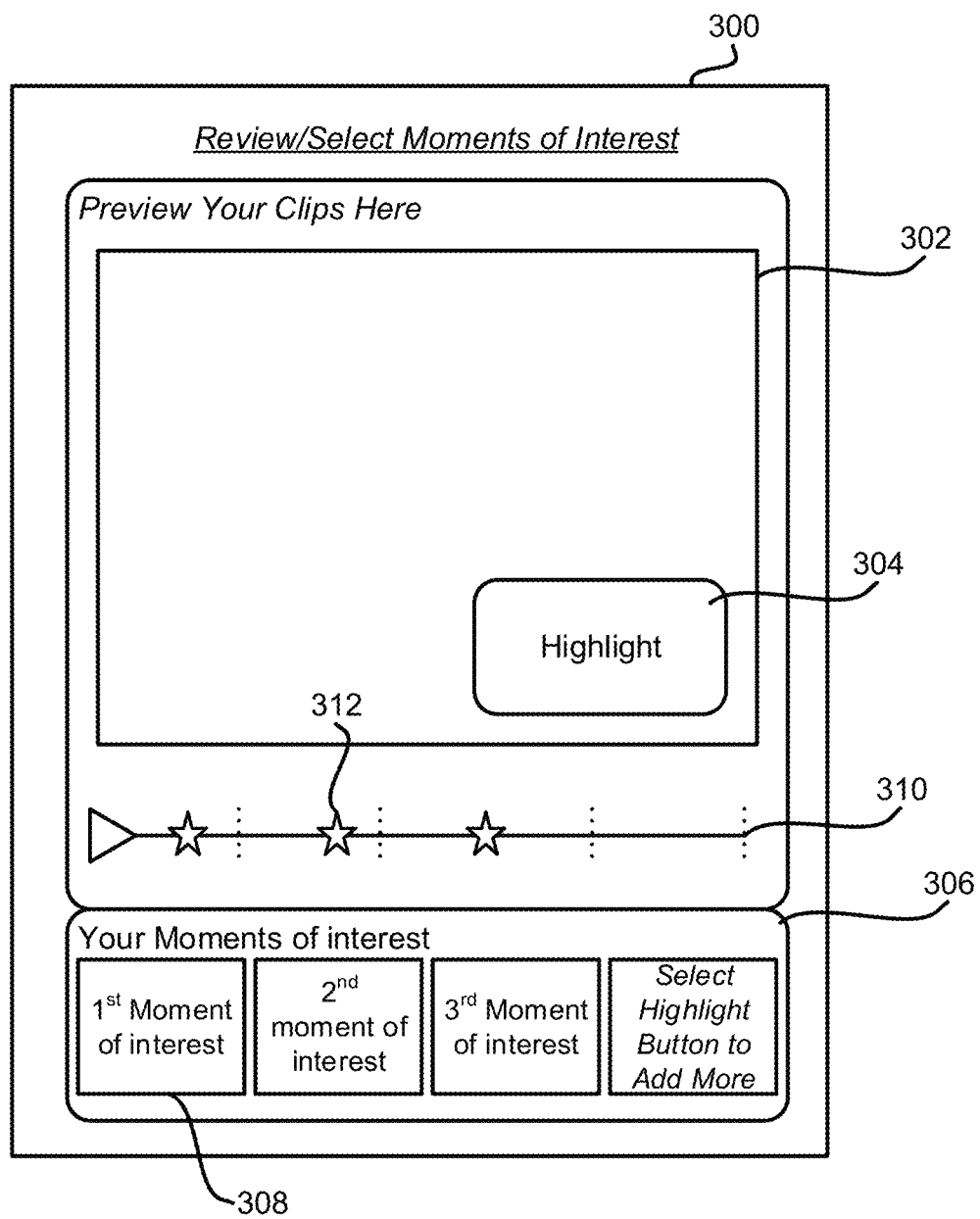
FIG. 3 illustrates an exemplary implementation of a user interface configured to facilitate user-initiated identifications of moments of interest within video clips post capture.

In some implementations, users may initiate identifications of moments of interest during editing and/or playback of a video clip. By way of non-limiting example, a user interface configured to facilitate editing of video clips may be configured to allow a user to select a point in time during playback of the video clip to associate the point in time with a moment of interest. By way of non-limiting illustration, FIG. 3 depicts an exemplary implementation of a user interface 300 configured to facilitate user-initiated identification of moments of interest within video clips post capture. In some implementations, the user interface 300 may further be configured to facilitate user review of identified moments of interest.

User interface 300 may include one or more user interface elements. The user interface elements may comprise one or more of a first window 302, a second window 306, a first selectable element 304, and/or other user interface elements. In some implementations, second window 306 may be configured to display moments of interest within one or more video clips selected to generate a video. For example, second window 306 may be populated based on a selection of video clips by a user. The currently selected video clips may be represented by a timeline 310. Transitions between video clips may be represented by dotted lines overlaid on timeline 310. In some implementations, an order in which video clips may be played may correspond to an order in which individual video clips may have been selected by a user. It is noted that ordering and/or playback of the video clips may not represent an edited video that comprises the video clips. Instead, the ordered playback may simple provide a technique for a user to review the selected video clips.

Moments of interest may be represented by images 308 that may include one or more of thumbnail images of individual ones of the moments of interest within the video clips, color intensity map, a heat map, and/or other features. In some implementations, a visual highlight may provide a functionality of allowing a user to quickly select the visual highlight. By way of non-limiting example, a visual highlight may provide a functionality of a snap operation where a cursor may automatically move to a location on a user interface where the visual highlight may be located. In some implementations, the moments of interest displayed may include moments of interest corresponding to one or more of user-initiated identifications, system identified moments of interest, and/or other moments of interest. Further, moments of interest may be represented in timeline 310 via one or more user interface elements 312 overlaid on timeline 310.

In some implementations, moments of interest may be identified within individual video clips based on user-initiated identifications of the moments of interest during capture of video clips. Further, first selectable element 304 may allow a user to provide user-initiated identifications while viewing the video clips in first window 302. For example timeline 310 may further provide functionality of one or more of play, pause, rewind, and/or other functionality which may facilitate viewing video clips.

In some implementations, first selectable element 304 may comprise a user interface element which may be selected by a user during playback of a video clip. For example, user selection may be facilitated by hovering a cursor over first selectable element 304 and providing input (e.g., clicking a mouse). User selection of first selectable element 304 during playback of a video clip may initiate an identification of a moment of interest. The moment of interest may be associated with a point in time at which the user selected first selectable element 304 during playback. As a user initiates identification of moments of interest via first selectable element 304, additional thumbnail images associated with the user-initiated identifications may be added to second window 306.

Returning to FIG. 1, in some implementations, determining user preference based on user-initiated identifications of moments of interest may comprise determining values of one or more attributes of the video clips, and/or other operations. Determining user preference may further comprise determining values of one or more attributes that may be specifically associated with the moment of interest, and/or other operations. Determining user preference may further comprise associating one or more user preferences with one or more of the determined values of the one or more attributes, and/or other operations.

The user component 108 may be configured to determine user preferences based on monitoring usage of one or more applications external to system 100. Usage of external application may relate to online activities and/or other activities. Online activities may include activities in one or more of social networks (e.g., Facebook® and/or other social networks), video sharing applications (e.g., YouTube®, and/or other video sharing applications), music applications (e.g., Pandora®, and/or other music applications), and/or other external applications.

In some implementations, monitoring user activities in a social network may comprise one or more of determining user up-votes related to particular pages, persons, posts, and/or other portions of the social network; analyzing information input by the user (e.g., via a post, comment, reply, thread, and/or other methods of user input in a social network); and/or other operations. Analyzing information input by the user may comprise identify one or more of words, phrases, sentences, geo-locations, and/or other information input by the user. Determining user preference may comprise associating information input by the user with one or more values of one or more attributes.

By way of non-limiting example, determining user preferences may comprise determining one or more words input by a user associated with activity in a social network, and/or other operations. Determining user preferences may further comprise associating individual ones of the one or more words with one or more values of one or more attributes, and/or other operations. Determining user preferences may further comprise associating one or more user preferences with the one or more values of the one or more attributes, and/or other operations. For example, a first word input by the user in a post of a social network may be associated with a first value of a first attribute. A user preference may specify the first value of the first attribute. By way of non-limiting example, a user may post in a social media that they "just went surfing." The post may be analyzed to identify the word "surfing." The word "surfing" may be associated with a feature point detection attribute related to actions having a value of "surfing." A user preference may specify that the user prefers the value "surfing" for the feature point detection attribute of video clips.

The user component 108 may be configured to determine user preferences based on obtaining entry and/or selection of one or more preferences from the users directly. By way of non-limiting example, a user may be prompted to input, via user interface, one or more of their preferences with respect to one or more attributes of video clips, and/or other preferences. For example, a user may be promoted to input preferences when they register an account, when generating a video, when uploading a video clip, and/or at other times.

By way of non-limiting illustration, the user accounts managed by user component 108 may include a first user account and/or other user accounts. The first user account may be associated with a first user and/or other users of system 100. The first user account may include first user information associated with the first user. The first user information may include one or more of information identifying the first user, first security login information, first system usage information, first subscription information, first preference information, a first computing platform identification associated with the first user, first privacy setting information, and/or other information related to the first user.

In some implementations, the first preference information may define user preferences of the first user. The first preference information may define preferences of the first user with respect to one or more attributes of video clips, and/or other preferences. The first preference information may define a first preference of the first user with respect to a first attribute and/or other attributes. The first preference may specify one or more values of the first attribute and/or one or more values of one or more other attributes.

In some implementations, determining the first preference information may be based on monitoring system usage related to user-initiated identifications of moments of interest. By way of non-limiting example, at least one of the one or more values of the first attribute specified by the first preference may comprise a first value and/or other values. Determining the first preference may comprise identifying, within a video clip associated with the first user, a user-initiated identification of a moment of interest, and/or other operations. Determining the first preference may further comprise, determining values of attributes of the video clip, and/or other operations. The determination may include that the first attribute of the video clip has the first value. Determining the first preference may further comprise determining that the moment of interest associated with the user-initiated identification may be specifically associated with the first attribute of the video clip having the first value, and/or other operations. Determining the first preference may further comprise associating the first preference with at least the first value of the first attribute such that the first preference specifies at least the first value of the first attribute.

In some implementations, determining the first preference information may be based on monitoring system usage related to videos and/or video clips a user has up-voted and/or down-voted. By way of non-limiting example, at least one of the one or more values of the first attribute specified by the first preference may comprise a second value and/or other values. Determining the first preference may comprise determining that the first user has up-voted a video clip, and/or other operations. Determining the first preference may comprise determining values of attributes of the video clip. The determination may include determining that the first attribute of the video clip has the second value. Determining the first preference may comprise associating the first preference with the first attribute having at least the second value such that the first preference specifies at least the second value of the first attribute.

By way of non-limiting illustration, determining the first preference information may be based on monitoring system usage related to video uploads by the first user. By way of non-limiting example, at least one of the one or more values of the first attribute specified by the first preference may comprise a third value and/or other values. The user component 108 may determine that the first user has uploaded a first set of video clips. The first set of video clips may include a first amount of video clips. The first amount may comprise a threshold amount with which user preference may be inferred. Determining the first preference may comprise determining that the video clips within the first set of video clips commonly share the third value of the first attribute. Determining the first preference may comprise associating the first preference with the first attribute having at least the third value such that the first preference specifies at least the third value of the first attribute.

By way of non-limiting illustration, user component 108 may analyze a user's system use patterns related to video generation and/or video uploads. The use patterns may convey that the user generated a threshold amount of videos and/or uploaded a threshold amount of video clips that include a feature point detection attribute related to actions depicted within the video clips having a value of "skiing." For example, detected features points, object, and/or actions within the video clips may correspond to the act of skiing (e.g., including to one or more of a snowy mountain, a human form wearing skis, and/or other detectable feature points within a video and/or video clip). The user component 108 may be configured to determined that the user prefers videos and/or video clips depicting skiing.

By way of further non-limiting illustration, user component 108 may analyze a user's system use patterns to determine preferences related to multiple attributes. By way of non-limiting example, a use pattern related to up-voting videos the users viewed may be analyzed. The use patterns may convey that the user up-votes (e.g., "likes") an amount of video clips (e.g., up to a threshold amount) that commonly share one or more of a feature point detection attribute related to actions depicted within the video clips having a value of "surfing," a setting information attribute related to camera position having a value of "mounted on surfboard," a time attribute having a value of "6 PM," a geolocation attribute having a value of "Lo Jolla, Calif.," and/or other values of other attributes. The user component 108 may be configured to determine that the user prefers video clips and/or videos that include one or more of actions depicting surfing, that are recorded from the perspective of the surfboard, has a geolocation of La Jolla, Calif., includes a timestamp of 6 PM (and/or "evening" times), and/or other preferences.

The user interface component 110 may be configured to effectuate presentation of user interfaces at computing platforms 122 associated with the users. A user interface may be configured to facilitate one or more of registering for user accounts; accessing user accounts; providing user information for a user account; uploading video clips, videos, and/or other information; generating, editing, collaborating on, and/or distributing videos and/or video clips; and/or performing one or more other operations.

The moment of interest component 112 may be configured to obtain selections of individual sets of video clips, identify one or more moments of interest within individual video clips of a set of video clips for generating a video, and/or perform one or more other operations.

The moment of interest component 112 may be configured to obtain selections of sets of video clips in a variety of ways. Selections may be obtained by one or more of automatically based on user preference, based on user entry and/or selection of individual video clips for inclusion in individual sets of video clip, and/or based on other techniques.

By way of non-limiting example, moment of interest component 112 may be configured to obtain selections of sets of video clips automatically based on one or more users preferences. For example, a set of video clips may include a first video clip, a second video clip, and/or other video clips that commonly share values of one or more attributes. A user preference may specify one or more values of one or more attributes. The set of video clips may be selected based the commonly shared values matching values of one or more attributes specified by the user preference.

The moment of interest component 112 may be configured to obtain selections of sets of video clips based on user entry and/or selection of individual video clips for inclusion in individual sets of video clips. User entry and/or selections may be facilitated via a user interface. For example, a set of video clips may be selected based on user entry and/or selection of a first video clip, a second video clip, and/or other video clips for inclusion in the set of video clips used for generating a video.

The moment of interest component 112 may be configured to identify one or more moments of interest within individual video clips of a set of video clips for generating a video. Identification of moment of interests may be based on user preferences and/or other information.

A given moment of interest within a video clip may correspond to a point in time within the video clip. A point in time may include a time that may be identified along a timeline that may be representative of the video clip. By way of non-limiting example, a point in time may be represented by some time period following a reference start time of a video clip. If a video clip starts at time "00:00:00 (hr:min: sec)" (and/or other reference start time), a given point in time may correspond to time "XX:YY:ZZ," where "XX" may represent an hour mark, "YY" may represent a minute mark, and/or ZZ may represent a second mark following the reference start time of the video clip.

A given point in time within a video clip may be associated with values of one or more attributes of the video clip. By way of non-limiting example, a point in time may correspond to a point in a video clip where a value of an attribute may be determined. For example, a first point in time within a video clip may be the point in time in the video clip where a determination of a value of a first attribute may be made. By way of non-limiting example, for a feature point detection attribute of a video clip related to facial recognition having a value of a particular face, a determination of the value of the feature point detection attribute may be associated with a point in time in the video clip where the particular face is first clearly shown and/or otherwise detectable. The point in time may be associated with a moment of interest. The moment of interest may be specifically associated with the feature point detection attribute having the value of the particular face.

The moment of interest component 112 may be configured such that identifying individual moments of interest within individual video clips comprises determining individual values of individual attributes of individual video clips, and/or other operations. Identifying individual moments of interest within individual video clips may further comprise determining whether at least one value of at least one attribute of an individual video clip matches at least one value of at least one attribute specified by user preferences, and/or other operations. Identifying individual moments of interest within individual video clips may further comprise, responsive to determining that at least one value of at least one attribute of an individual video clip does match at least one value of at least one attribute specified by user preferences, determining a point in time within the individual video clip that may be specifically associated with the individual video clip having the at least one value of the at least one attribute, and/or other operations. Identifying individual moments of interest within individual video clips may further comprise associating the point in time with an individual moment of interest, and/or other operations.

By way of non-limiting illustration, at least one of the one or more values of the first attribute specified by the first preference may include a first value. The moment of interest component 112 may be configured such that identifying a first moment of interest within the first video clip comprises determining a value of the first attribute of the first video clip, and/or other operations. Identifying the first moment of interest may further comprise determining whether the value of the first attribute of the first video clip matches at least one value of one or more values of the first attribute specified by the first preference (e.g., the first value), and/or other operations. Identifying the first moment of interest within the first video clip may further comprise, responsive to determining that the value of the first attribute of the first video clip does match at least one value of the one or more values of the first attribute specified by the first preference, determining a first point in time within the first video clip that may be associated with the first video clip having the matched value of the first attribute, and/or other operations. Identifying the first moment of interest within the first video clip may further comprise associating the first point in time with the first moment of interest, and/or other operations. The first point in time may facilitate identifying the first moment of interest within the first video clip. In some implementations, the first video clip may comprise a video clip that the first user currently uploaded. In some implementations, the first video clip may comprise a stored video clip that was previously uploaded.

In some implementations, video component 114 may be configured to provide storyboards that may facilitate generating videos using video clips. A storyboard may specify organizational information related to how video clips and/or segments of video clips may be added to a video, and/or other information. In some implementations, a storyboard may be associated with supplemental audio that may be added to the generated video.

A segment of a video clip may comprise a temporal span of the video clip that be associated with the video clip having one or more values of one or more attributes. For example, a moment of interest of a video clip may correspond to a first point in time that may be associated with the video clip having a first value of a first attribute. The temporal span may be associated with one or more other points in time distributed around the first point in time that may further be associated with the video clip having the first value of the first attribute. A segment of the video clip may be identified by the first point in time and the one or more other points in time distributed around the first point in time. For example, based on a temporal distribution of the first point in time and the one or more other points in time, a reference start time and/or a reference end time may be determined.

In some implementations, organizational information may include information specifying one or more of a quantity of portions of the video with which video clip segments may be provided, proposed lengths of individual portions of the video, and/or other information. By way of non-limiting example, a storyboard may be associated with a given quantity of segments of video clips that may be selected to generate a video (e.g., corresponding to the quantity of individual portions of the video specified by the storyboard). Further, individual video clips and/or segments selected for a video may be adjusted such that their temporal lengths match the proposed lengths of the individual portions of the video.

In some implementations, quantities and/or proposed lengths of individual portions of a video associated with a given storyboard may be predetermined based on supplemental audio that may be added to generated video. Supplemental audio may include one or more audio moments of interest. An audio moment of interest may correspond to an orchestrated transition within the supplemental audio. An orchestrated transition may correspond to a point in time within the supplemental audio. An orchestrated transition may include one or more of a start of a crescendo, an end of a crescendo (e.g., a climax), a start of a diminuendo, an end of a diminuendo, a tempo change, an instrumentation change (e.g., a point in time when one or more instrument and/or vocal tracks may be stopped or started), stems, audio intensity, and/or other orchestrated transitions within supplemental audio.

In some implementations, orchestrated transitions may be identified within supplemental audio via one or more audio recognition techniques. By way of non-limiting example, an audio recognition technique may analyze sound levels, tempos, stems, sound segmentation, syncopation, and/or other aspects of supplemental audio to identify one or more orchestrated transitions.

In some implementations, organizational information may include information specifying that a transition between individual portions of the video may be synchronized with a given audio moment of interest. For example, given a point in time in supplemental audio associated with an audio moment of interest, a storyboard may specify that a first portion of a video must be of a first proposed temporal length so that the end of the first portion (e.g., a transition) occurs at the point in time of the audio moment of interest. Such synchronization may mimic the type of video editing a user may do through manual editing. Proposed lengths of other portions of the video may be specified based on synchronization of other transition with other audio moments of interest.

In some implementations, a synchronization of a transition between individual portions of a video with an audio moment of interest may establish an effect of a theme or mood of the video. For example, a transition between a first segment that comprises a first portion of the video and a second segment that comprise a second portion of the video may be synchronized with a first audio moment of interest of supplemental audio in accordance with a first theme. By way of non-limiting example, a transition between a video clip segment depicting little activity to a video clip segment that may be action packed may be synchronized with a tempo change in the supplemental audio in manner to increase a viewer's excitement, for example, as related to an action themed video.

In some implementations, organizational information may include information specifying that individual moments of interest within video clips may be synchronized with individual audio moments of interest. Such synchronization may further mimic the type of video editing a user may do through manual editing. By way of non-limiting example, a first segment may be provided as a first portion of a video. The first segment may include a first moment of interest. A storyboard may specify that the occurrence of the first moment of interest within the first portion of the video should be synchronized with a point in time associated with a first audio moment of interest of supplemental audio that may accompany the video. In other words, the timing of the presentation of the moment of interest may be synchronized with the audio moment of interest in the supplemental audio. By way of non-limiting example, the first moment of interest may be related to a surfing maneuver. An audio moment of interest may be associated with an end of a crescendo (e.g., a climax). In an action themed video, this may convey a "build-up" to the surfing maneuver which may be exciting to the viewer.

In some implementations, for timing the presentation of moments of interest within segments with audio moments of interest, one or more segments may be adjusted. For example, one or both of a reference start time or a reference end time within a video clip that may define a segment may be adjusted such that a point in time associated with a moment of interest may occur closer towards the reference start time or reference end time. As such, a segment may be adjusted such that it may encompass a different temporal span of a video clip than originally determined.

Figure 5:
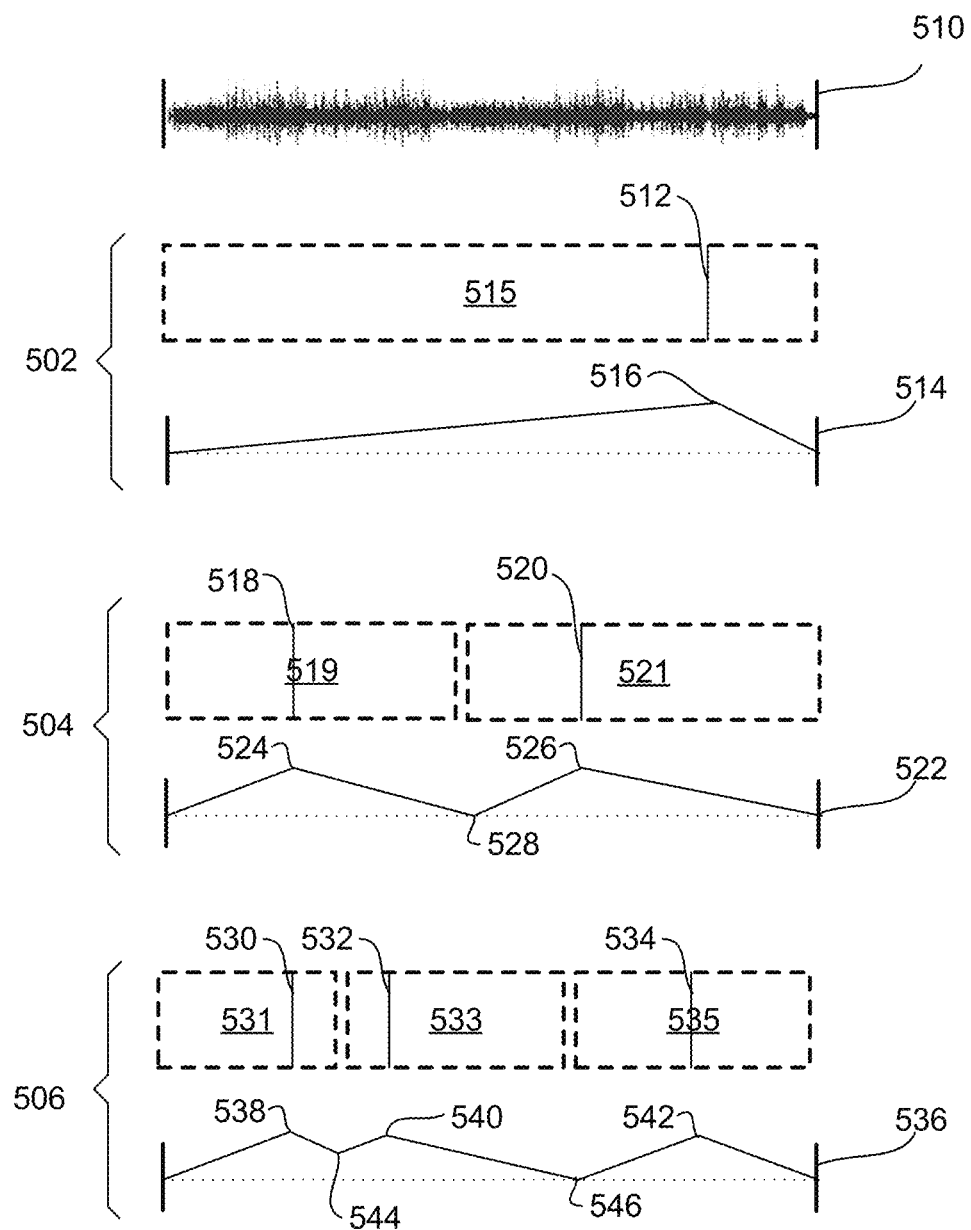
FIG. 5 illustrates various implementations of storyboards, in accordance with one or more implementations.

By way of non-limiting illustration, FIG. 5 depicts various implementations of storyboards. For illustration, the various implementations shown may be associated with supplemental audio represented by waveform 510. As described previously, individual storyboards may specify organizational information including one or more of a quantity of portions of a video, temporal lengths of portions of the video, synchronization of transitions with audio moments of interest, synchronization of moments of interest within segments with audio moments of interest, and/or other information.

In some implementations, audio moments of interest within supplemental audio may be represented via timelines of a given storyboard. In general, timelines may include plots having peaks and troughs. Peaks may be associated with audio moments of interest that may be synchronized with moments of interest within video clip segments, while troughs may be associated with audio moments of interest that may be synchronized with transitions between portions of the video. In some implementations, the form of a given timeline may depend on factors including one or more of the quantity of portions of a video associated with a storyboard, a quantity and types of audio moments of interest within supplemental audio, and/or other factors.

In the current depictions of the various storyboards, the form of the timelines are such that a single audio moment of interest is identified per portion of the video associated with the storyboard. However, it is noted that this is for illustrative purposes only and is not to be considered limiting. For example, in other implementations, more than one audio moment of interest may be identified per portion of a video. In addition, the current depiction provide examples of storyboard including one, two, or three portions. However, this is illustrative purposes and not to be considered limiting. For example, in other implementations storyboards may specify more than three portions of a video.

For example, a first story board 502 may specify a first portion 515 of a video having a first temporal length. The first temporal length may span part or all of a temporal length of the supplemental audio. The first storyboard 502 may include a first timeline 514 representing an identification of one or more audio moments of interest within the supplemental audio represented by waveform 510. For example, the first timeline 514 may include a first peak 516 positioned on first timeline at a point in time associated with an audio moment of interest within supplemental audio. In some implementations, the audio moment of interest may be identified based on a theme and/or mood of a video. By way of non-limiting example, first timeline 514 includes first peak 516 positioned relatively closer to the end of the supplemental audio than the start of the supplemental audio. This may convey a type of "build up" during playback of the video that may correspond to a first theme. For example, the first theme may be an action theme having an effect of building up the viewers anticipation until the occurrence of an audio moment of interest towards the end of the supplemental audio. The first storyboard 512 may further specify that a timing of a presentation of a moment of interest may be synchronized with the audio moment of interest. For example, this is visually represented by element 512 positioned along first portion 515 at a point in time that is aligned with first peak 516. A video clip and/or segment of a video clip including a moment of interest may be adjusted such that the moment of interest may be presented as such a point in time (e.g., and therefore synchronized with the audio moment of interest).

A second storyboard 504 may specify one or more of a second portion 519 of a video having a second temporal length, a third portion 521 having a third temporal length, and/or other portions. The second storyboard 502 may include a second timeline 522 representing an identification of one or more audio moments of interest within the supplemental audio represented by waveform 510. For example, the second timeline 522 may include one or more of a second peak 524, a third peak 526, a first trough 528, and/or other peaks and/or troughs associated with audio moments of interest within supplemental audio. The second storyboard 504 may further specify timing of presentations of moments of interest and/or transitions to be synchronized with audio moments of interest. For example, this is visually represented by elements 518 and 520 positioned along second portion 519 and third portion 521 at points in time that may be aligned with second peak 524 and third peak 526, respectively. A synchronization of a transition between second portion 518 and third portion 520 with an audio moment of interest is shown by the alignment of the transition with first trough 528.

A third storyboard 506 may specify one or more of a fourth portion 531 of a fourth temporal length, a fifth portion 533 of a fifth temporal length, a sixth portion 535 of a sixth temporal length, and/or other portions. The third storyboard 506 may include a third timeline 536 representing an identification of one or more audio moments of interest within the supplemental audio represented by waveform 510. For example, the third timeline 536 may include one or more of a fourth peak 538, a fifth peak 540, a sixth peak 542, a second trough 544, a third trough 546, and/or other peaks and/or troughs associated with audio moments of interest within supplemental audio. The third storyboard 506 may further specify timing of presentations of moments of interest and/or transitions to be synchronized with audio moments of interest. For example, this is visually represented by elements 530, 532, and 534 positioned along fourth portion 531, fifth portion 533, and sixth portion 535 at respective a points in time that may be aligned with fourth peak 538, fifth peak 540, and sixth peak 542, respectively. A synchronization of transitions between fourth portion 531 and fifth portion 533, and fifth portion 533 and sixth portion 535 with audio moments of interest is shown by the alignment of the transitions with second trough 544 and third trough 546, respectively.

Returning to FIG. 1, in some implementations, video component 114 may be configured to generate videos based on sets of video clips. The video component 114 may be configured such that generating a video may be based on associations of individual moments of interest with individual portions of the video. Associating individual moments of interest with individual portions of video may comprise identifying segments within individual video clips that are associated with an individual moment of interest identified within individual video clips, and/or other operations.

In some implementations, a segment may be identified based on detections made within the video clip. By way of non-limiting example, a feature point, object, and/or action may be identified in a video clip that may identify multiple points in time associated with one or more attributes of a video clip having a particular value. The identified points in time may be temporally distributed. The temporal distribution may facilitate determining a reference starting point in time and/or a reference ending point in time associated with the one or more attributes having the particular value.

By way of non-limiting example, a moment of interest may be associated with a first point in time in the first video clip. The first point in time may correspond to the video clip having a first value of a first attribute. A first segment of the video clip may be identified based on one or more other points in time distributed around the first point in time that may be similarly associated with the first attribute of the video clip having the first value.

By way of non-limiting illustration, following the above facial recognition example, a moment of interest related to facial recognition may be associated with a first point in time where a particular face may be clearly shown and/or otherwise detectable. The moment of interest may further be associated with one or more other points in time distributed around the first point in time where the particular face is still shown and/or otherwise detectable. A segment of the video clip may be identified based on the first point in time and the one or more other points in time. By way of non-limiting example, the first point in time and the one or more other points in time may be temporally distributed such that a reference start time and a reference end time may be determine. The span of the video clip between the reference start time and the reference end time may comprise the segment of the video clip associated with the moment of interest.

The video component 114 may be configured such that associations of individual moments of interest with individual portions of video may be based on associations of individual segments of video clips with individual portions of the video. In some implementations, associating individual segments of video clips with portions of a video may be based on one or more of matching lengths of segments with lengths of portions of video, organization information associated with a storyboard, and/or based on other criteria.

The video component 114 may be configured such that generating video based on the associations may comprise providing individual segments as individual portions of the video. Providing individual segments as individual portions of video may comprise one or more of changing temporal lengths of individual segments and/or portions of video, timing the presentation of moments of interest based on organization information, and/or other operations.

By way of non-limiting example, a given segment of a video clip having a given temporal length may be associated with a given portion of a video that may also have the given temporal length and/or substantially same given temporal length.

In some implementations, providing a given segment of a video clip as a given portion of a video may comprise changing a temporal length of one or both of the given segment or the given portion of video such that the given segment and given portion are of the same or substantially the same temporal length. In this manner, the given segment and given portion of video may match such that the given segment may "fit" into the corresponding portion of the video.

In some implementations, changing a temporal length of a segment of a video clip (or portion of a video) may comprise one or more of shortening the segment of video, expanding the segment of video, and/or other operations. Shortening the segment of video may comprise one or more of cropping and/or editing out some of the segment of video clip, speeding up a playback rate of the segment, and/or other operations. Expanding the segment of video may comprise one or more of capturing more of the original video clip than was originally captured by the segment of video, slowing down a playback rate of the segment (e.g., generating a "slow-mo" version of the segment), and/or other operations.

In some implementations, video component 114 may be configured to provide supplemental audio to add to and/or replace audio of video clip used to generate a video. Replacing audio may comprise one or more removing and/or erasing audio information the video clips, providing information that represents the supplemental audio as new audio information of the video, partially supplementing source audio with supplemental audio, and/or other operations. In some implementation, partially supplementing source audio may comprise providing supplemental audio such that the audio of a video comprises a mix of source audio and supplemental audio. By way of non-limiting illustration, supplemental audio may be provided such that audio of the video may comprise supplemental audio that may fade in and/or out of the source audio. In some implementations, the fade in and/or out between source audio and supplemental audio may synchronized with presentation of moments of interest to provide an emphasis of source audio at a given moment of interest. The video may then fade back into supplemental audio.

Providing supplemental audio may comprise selecting the supplemental audio, and/or other operations. Selections may be based on one or more of user entry and selection of the supplemental audio, user preferences, story theme, and/or based on other criteria.

In some implementations, video component 114 may be configured such that providing supplemental audio may comprise one or more of changing a temporal length of one or more portions of a video such that the a transition between an end of the portion of the video and a start of a subsequent portion of the video may be synchronized with the supplemental audio. By way of non-limiting example, supplemental audio may comprise one or more of commentary, a sound effect, a song, music, and/or other audio. In some implementations, supplemental audio may comprise a song. The song may be associated with a tempo. The song may have beats that follow the tempo. In some implementations, synchronizing a transition between portions of a video may comprise synchronizing the transition with a beat of a song. Synchronization may be accomplished in other ways.

By way of non-limiting illustration, generating a first video using a first set of video clips may be based one or more of a first association of a first moment of interest within a first video clip with a first portion of the first video, a second association of a second moment of interest within a second video clip with a second portion of the first video, and/or other associations of other moments of interest with other portions of the first video. Associating the first moment of interest with the first portion may comprise identifying a first segment of the first video clip, and/or other operations. The first segment may be associated with the first moment of interest. The first segment may comprise a first temporal span of the first video clip. The first portion of the first video may comprise a temporal length that is the same or similar length as the first temporal span of the first video clip. Associating the first moment of interest with the first portion may be based on the first segment being associated with the first portion based on temporal length.

Associating the second moment of interest with the second portion may comprise identifying a second segment of the second video clip, and/or other operations. The second segment may be associated with the second moment of interest. The second segment may comprise a second temporal span of the second video clip. The second portion of the first video may comprise a temporal length that is the same or similar length as the second temporal span of the second video clip. Associating the second moment of interest with the second portion may be based on the second segment being associated with the second portion based on temporal length.

Generating the first video may comprise one or more of providing the first segment as a first portion of the first video, providing the second segment as a second portion of the first video; and/or other operations. In some implementations, providing the first segment as a first portion of the first video and/or providing the second segment as a second portion of the first video may comprise one or more of changing temporal lengths of individual segments and/or portions of video, timing the presentation of moments of interest with respect to one or more audio moments of interest within supplemental audio, and/or other operations.

In some implementations, providing the first segment as the first portion of the video may comprise changing a temporal length of one or both of the first segment or the first portion such that that the first segment and the first portion may have the same, or substantially the same temporal length, and/or other operations. In some implementations, providing the first segment as the first portion may comprise changing a temporal length of one or both of the first segment or the first portion such that the first moment of interest may be synchronized with a first audio moment of interest within first supplemental audio of the first video. In some implementations, providing the first segment as the first portion may comprise changing a temporal span of the first video clip captured by the first segment such that the first moment of interest may be synchronized with the first audio moment of interest within first supplemental audio of the first video. A temporal length and/or temporal span encompassed by one or more of the second segment, and/or other segments of video clip may further be changed to achieve such synchronization of other transitions with other beats of the song.

In some implementations, the first supplemental audio may comprise a song and/or other audio. The video component 114 may be configured such that synchronizing the first supplemental audio with the transition between the end of the first portion and the start of the second portion of the video may comprise synchronizing the transition with a beat of the song.

In some implementations, user interface component 110 may be configured to facilitate editing of an automatically generated video. Editing may comprise one or more of selecting moments of interest, changing selections of moments of interest, adjusting temporal lengths of one or more segments of a video clip, adjusting temporal lengths of one or more portions of video, organizing/reorganizing positions of segments of video clips within a video, and/or other editing operations.

In some implementations, adjusting temporal lengths of segments of video clip and/or portions of video may be facilitated by one or more user interface elements of the user interface. By way of non-limiting example, a video and/or video clip may be graphically displayed on the user interface as a timeline that may represent the video and/or video clip. Individual ones of the one or more user interface elements may correspond to one or more of a start of the video clip, an end of the video clip, a start of a segment, an end of a segment, and/or other features of the video clip and/or video. A user interface element may be selectable by a user. By way of non-limiting example, a user interface element may be configured as a sliding element, drag-and-drop element, and/or other user interface element that may be position/repositioned by a user. By way of non-limiting example, a user interface element representing a start of a segment of a video clip may be selectable by a user and slid along a timeline to a desired point in time on the timeline.

Figure 2:
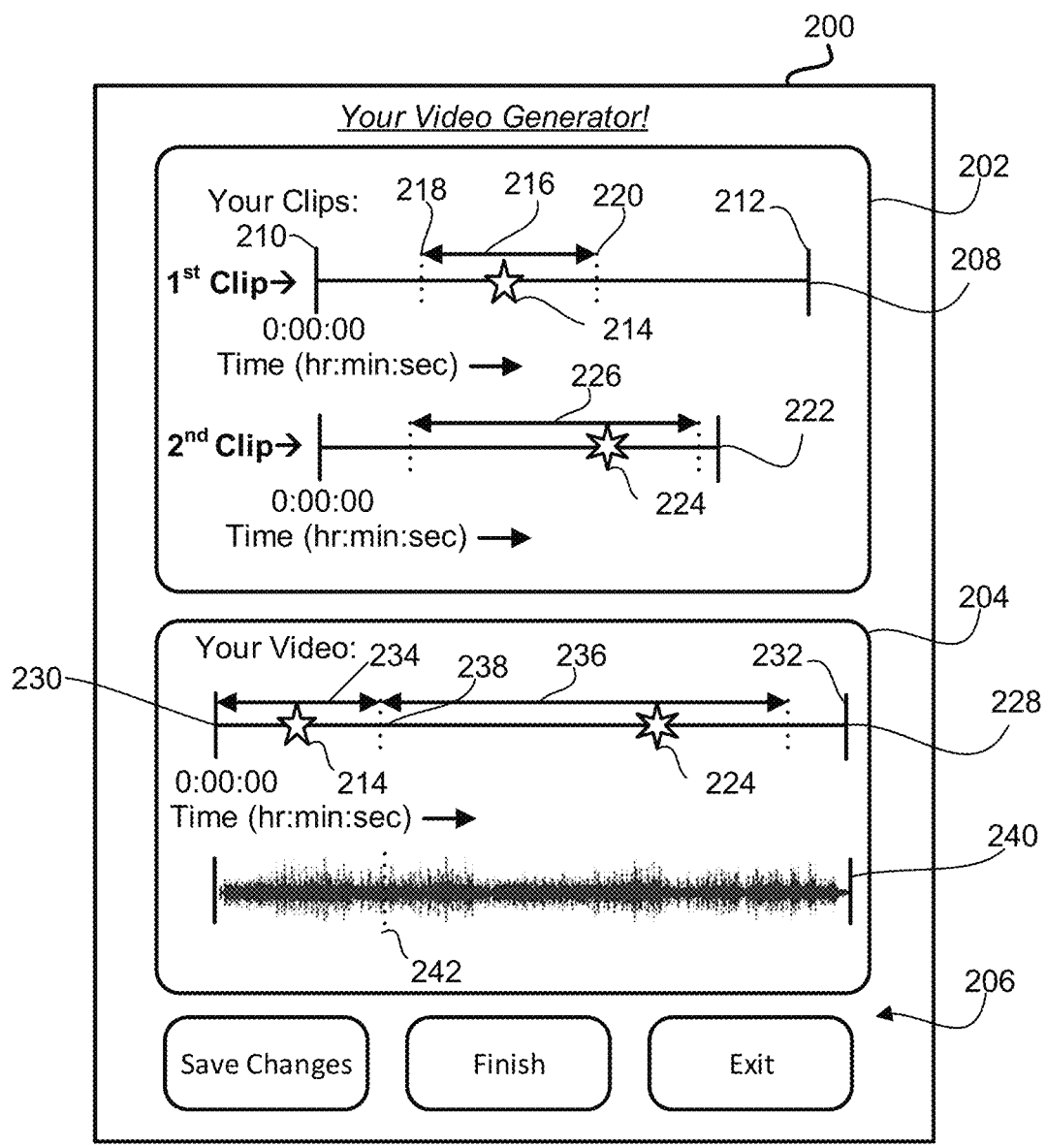
FIG. 2 illustrates an exemplary implementation of a user interface configured to facilitate editing of an automatically generated video by a user.

By way of non-limiting illustration, FIG. 2 shows an exemplary implementation of a user interface 200 configured to facilitate editing of an automatically generated video. The user interface 200 may be configured to show a generation of a video from a set of video clips. The user interface 200 may include one or more of a first window 202, a second window 204, a set of user interface elements 206, and/or other components. The first window 202 may be configured to display a set of video clips selected for generating a video. The set of video clips may comprise one or more of a first video clip, a second video clip, and/or other video clip. The first video clip may be represented by a first timeline 208 displayed in the first window 202. The second video clip may be represented by a second timeline 222 displayed in the first window 202.

The first timeline 208 may be represented by a first start 210, a first end 212, and/or other features. The first video clip may include a first moment of interest represented by a first user interface element 214. The first user interface element 214 may be positioned alone the first timeline 208 corresponding to a point in time of the first moment of interest. The first user interface element 214 may be selectable by a user to change the point in time with which the first moment of interest may be associated. By way of non-limiting example, the first user interface element 214 may be selectable by a user via a drag-and-drop feature, slide feature, and/or by other techniques that may facilitate positioning/repositioning the first user interface element 214 along the first timeline 208.

The first moment of interest may be associated with a first segment 216. The first segment 216 may correspond to one or more of a second user interface element 218 representing a start of the first segment 216, a third user interface element 220 representing an end of the first segment 216, and/or other features. The second and/or third user interface elements 218, 220 may be selectable by a user to change points in time with which the respective start and end of the first segment 216 may be associated. By way of non-limiting example, the second and/or third user interface elements 218, 220 may be selectable by a user via a drag-and-drop feature, slide feature, and/or by other features that may facilitate positioning/repositioning the start and/or end of the first segment 216 to change a temporal span of the first segment 216 within the first video clip.

It is noted that the second video clip represented by the second timeline 222 may include similar features as those presented above in connection with the first video clip (e.g., and first timeline 208). However, to simplify and clarify the present description, only a fourth user interface element 224 representing a second moment of interest and a second segment 226 that corresponds to the second moment of interest are shown.

The second window 204 of the user interface 200 may include one or more of a third timeline 228 that may represent a video generated based on the set of video clips portrayed in the first window 202, a representation of supplemental audio 240, and/or other features. The third timeline 228 may be represented by a second start 230, a second end 232, and/or other features. The third timeline 228 may include a first portion 234 of the video with which the first moment of interest may be associated (e.g., illustrated by the first user interface element 214 being positioned on the third timeline 228 within the first portion 234). The third timeline 228 may include a second portion 236 of the video with which the second moment of interest may be associated (e.g., illustrated by the fourth user interface element 224 being positioned on the third timeline 228 within the second portion 236). In some implementations, the first portion 234 may include the first segment 216, a portion of the first segment 216, and/or an expanded version of the first segment 216. In some implementations, the second portion 260 may include the second segment 226, a portion of the second segment 226, and/or an expanded version of the second segment 226.

In some implementations, a start of the first portion 234 may be represented by the second start 230 of the third timeline 228. An end of the first portion 234 and/or start of the second portion 236 may be presented by a first transition between the first portion 234 and the second portion 236. The first transition may be represented by a fifth user interface element 238. One or more of the first user interface element 214, fourth user interface element 224, fifth user interface element 238, and/or other features of the third timeline 228 may be selectable by a user for positioning and/or repositioning. It is noted that although the third timeline 228 representation of the video currently depicts only the first portion 234 and the second portion 236, the video may include other portions that may be associated with other moments of interest identified in the first video clip, second video clip, and/or other video clips.

In some implementations, the generated video may be synchronized with supplemental audio. This may be shown by a representation of a beat 242 within the representation of the supplemental audio 240 being aligned with the first transition (e.g., visually shown as being aligned with the fifth user interface element 238). Repositioning of one or both of the representation of the supplemental audio 240 and/or fifth user interface element 238 may allow a user to change the automatic synchronization, if desired. It is noted that synchronization may be facilitated by aligning other beats and/or other parts of the supplemental audio with other transitions and/or other parts of the video.

Figure 4:
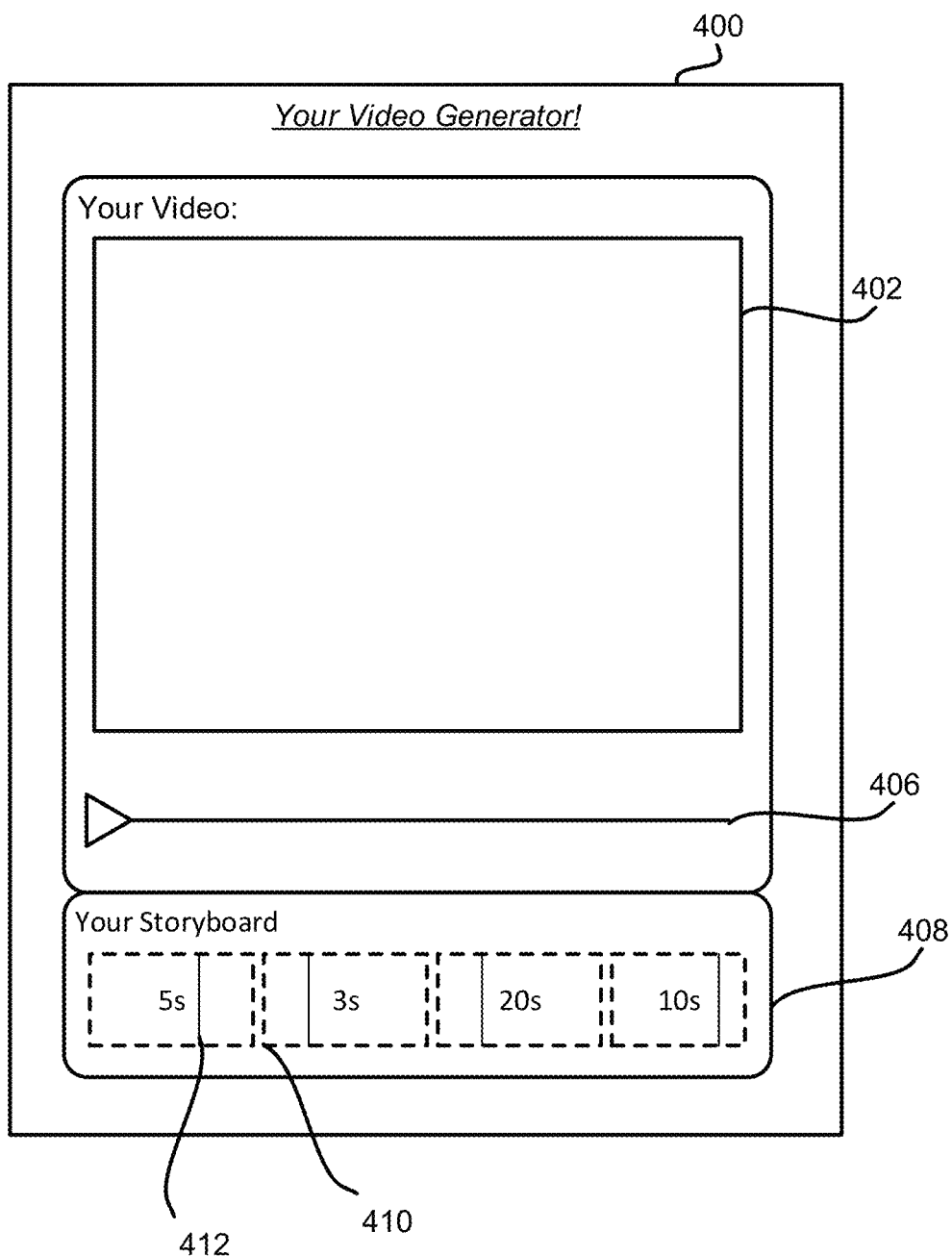
FIG. 4 illustrates an exemplary implementation of a user interface configured to facilitate generating videos based on storyboards.

In some implementations, user interface component 110 may be configured to provide a user interface that allows users to edit video clips to generate videos based on storyboards. By way of non-limiting illustration, FIG. 4 depicts an exemplary user interface 400 configured to facilitate generating videos based on storyboards. In some implementations, users may selected a desired storyboard that specifies organizational information as described herein.

The user interface 400 may include one or more user interface elements. The user interface elements may include one or more of a first window 402, a second window 408, a timeline 406, and/or other user interface elements. In some implementations, the first window 402 may comprise a previewing area in which a user may view a video, and/or part of a video, during and/or after generation of the video. In some implementations, timeline 406 may provide functionality of playing, pausing, rewinding, and/or fast-forwarding playback of a video through one or more user interface elements.

Second window 408 may display organizational information 408 of a storyboard. By way of non-limiting example, the organizational information 408 may include placeholders corresponding to individual portions of a video. Users may add video clips and/or segments of video clips based on suggested temporal lengths of portions of the video associated with the placeholders. Individual ones of the portions may further be associated with one or more suggested points in time where moments of interest should be presented for timing with audio moments of interest of supplemental audio. For illustrative purposes, placeholders may be depicted by a set of dashed boxes 410, which indicate a suggest length for the video clip and/or segment to be provided for that portion (e.g., shown as 5 seconds, 3 second, 20 seconds, and 10 seconds). Individual ones of the boxes may further depict elements 412, or other indication, of a suggest timing of a moment of interest with respect to audio moments of interest of supplemental audio.

A user may add video clips and/or segments of video clips having the suggested temporal lengths into individual ones of the placeholders. Adding video clips and/or segments may be facilitated by one or more of drag-and-drop, selection from a drop down menu, checkboxes, and/or other techniques. By way of non-limiting example, an additional user interface (not shown) may be provided concurrently with user interface 400 that includes thumbnails showing the various video clips and/or segments available to the user.

In some implementations, users may add video clips and/or segments that may be different than the suggested temporal lengths. When a user adds a video clip and/or segment, the video clip and/or segment may be automatically adjusted such that one or both of the temporal length of the video clip and/or segment matches the length of the portion, and/or the video clip and/or segment is adjusted such that a moment of interest may be synchronized with an audio moment of interest.

Returning to FIG. 1, the distribution component 116 may be configured to distribute videos according to instructions from a user. The distribution component 116 may distribute videos to a list of contacts specified by the user. For example, distribution component 116 may share videos created by a user via emails, snail mails, social networks, and/or other distribution techniques. A user may configure and manage their privacy settings information related to users who can access their videos and/or video clips. The distribution component 116 and/or user interface component 110 may be configured provide an user interface where users may share videos with other users of system 100. A user may tag users as well as objects in the videos and/or video clips.

In some implementations, distribution component 116 may be configured to recommend to a user one or more videos that may be of interest. The one or more videos may be identified according to the user's interests and/or preferences, locations, life events (e.g., birthday, anniversary), real-time events, and/or based on other criteria. The distribution component 116 may be configured to create one or more channels for recommending videos and/or video clips to a user. Individual channel may include videos and/or video clips that share one or more attributes. The videos and/or video clips may include content of different topics. The distribution component 116 may be configured to distribute live-broadcasts, recorded video and/or video clips, and/or other media items.

Returning to FIG. 1, the server 102, computing platforms 122, external resources 124, and/or other entities may be operatively linked via one or more electronic communication links. For example, such electronic communication links may be established, at least in part, via a network 120. In some implementations, network 120 may comprise the Internet and/or may employ other communications technologies and/or protocols. By way of non-limiting example, network 120 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the network 120 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 100 may use custom and/or dedicated data communications technologies instead of, or in addition to, the ones described above.

It will be appreciated that this is not intended to be limiting and that the scope of this disclosure includes implementations in which server 102, computing platforms 122, external resources 124, and/or other entities may be operatively linked via some other communication media.

External resources 124 may include sources of information, hosts, and/or other entities outside of system 100, external entities participating with system 100, and/or other resources. In some implementations, some or all of the functionality attributed herein to external resources 124 may be provided by resources included in system 100.

The server 102 may include electronic storage 118, and/or other components. The server 102 may include communication lines or ports to enable the exchange of information with a network and/or other entities. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 104, information received from server 102, information received from computing platforms 122, and/or other information that enables server 102 to function as described herein.

Processor(s) 104 is configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 108, 110, 112, 114, and/or 116. Processor 104 may be configured to execute components 108, 110, 112, 114, and/or 116 by software; hardware; firmware; some combination of software, hardware, and/or firmware; and/or other mechanisms for configuring processing capabilities on processor 104.

It should be appreciated that although components 108, 110, 112, 114, and/or 116 are illustrated in FIG. 1 as being co-located within a single processing unit, in implementations in which processor 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor 104 may be configured to execute one or more additional components that may perform some or all of the functionality attributed below to one of components 108, 110, 112, 114, and/or 116.

Figure 6:
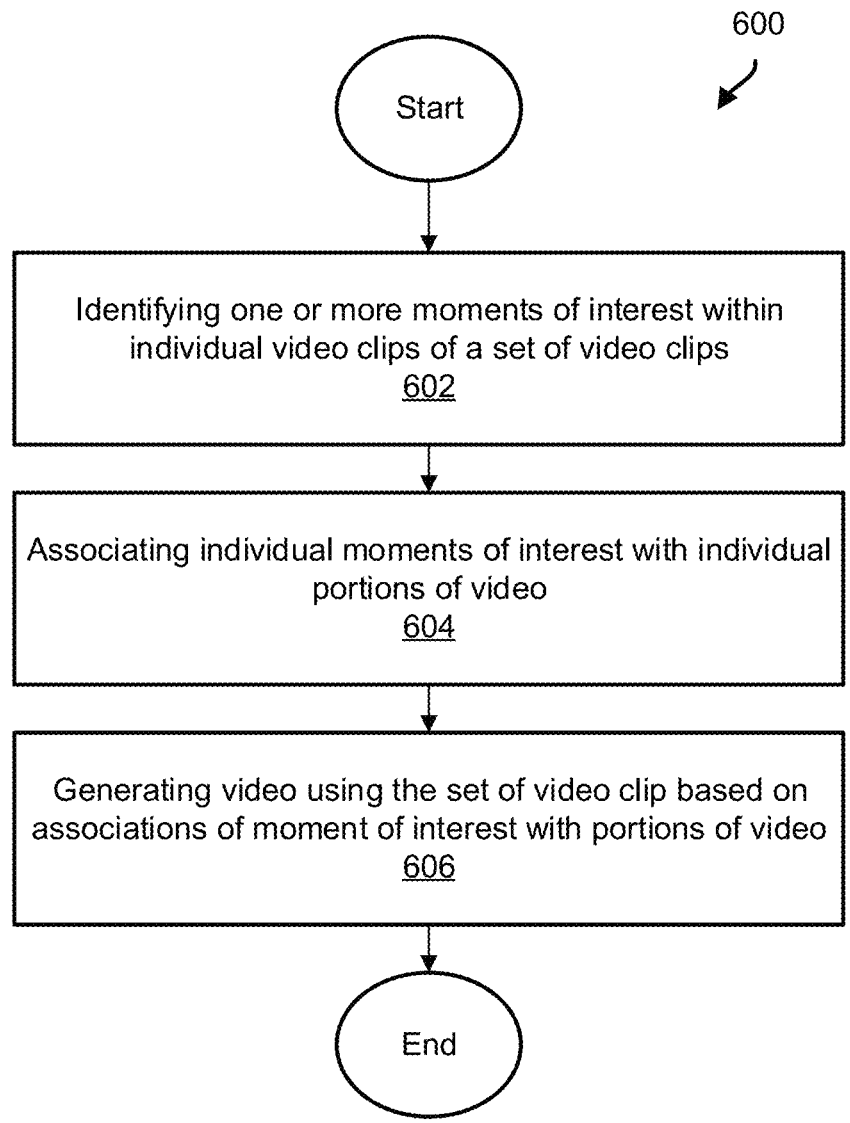
FIG. 6 illustrates a method of generating videos from video clips based on one or more moments of interest within individual ones of the video clips, in accordance with one or more implementations.

FIG. 6 illustrates a method 600 of generating videos from video clips based on one or more moments of interest within individual ones of the video clips, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 600 in response to instructions stored electronically on electronic storage medium. The one or more processing devices may include one or more devices configured through hardware, firmware, and/or software to be specifically designed for execution of one or more of the operations of method 600.

At an operation 602, one or more moments of interest within individual video clips of a set of video clips may be identified. The set of video clips may comprise a first video clip, a second video, and/or other video clips. By way of non-limiting example, a first moment of interest and/or other moments of interest may be identified within the first video clip. The first moment of interest may correspond to a first point in time within the first video clip. The first point in time may be associated with the first video clip having a first value of a first attribute. A second moment of interest and/or other moments of interest may be identified within the second video clip. The second moment of interest may correspond to a second point in time within the second video clip. The second point in time may be associated with the second video clip having a second value of a second attribute. In some implementations, operation 602 may be performed by one or more physical processors executing a moment of interest component the same as or similar to moment of interest component 112 (shown in FIG. 1 and described herein).

At an operation 604, individual moments of interest may be associated with individual portions of the video. By way of non-limiting example, the associations may include a first association of the first moment of interest with a first portion of the video. The associations may include a second association of the second moment of interest with a second portion of the video. In some implementations, operation 604 may be performed by one or more physical processors executing a video component the same as or similar to video component 114 (shown in FIG. 1 and described herein).

At an operation 606, the video may be generated using the set of video clips based on the associations. By way of non-limiting example, the video may be generated using the first video clip based on the first association and the second video clip based on the second association. In some implementations, operation 606 may be performed by one or more physical processors executing a video component the same as or similar to the video component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for generating videos from video clips, the system comprising:
  one or more physical processors configured by machine-readable instructions to:
    identify one or more moments of interest within individual video clips of a set of video clips for generating a video edit, the set of video clips comprising a first video clip and a second video clip such that a first moment of interest is identified within the first video clip and a second moment of interest is identified within the second video clip:
    provide story themes for user selection, wherein individual ones of the story themes are defined by different sets of rules for automatically generating the video edit, the story themes including a first story theme and a second story theme different from the first story theme, the first story theme defined by a first set of rules for automatically generating the video edit and the second story theme defined by a second set of rules for automatically generating the video edit, the first set of rules being different from the second set of rules, the first set of rules and the second set of rules including different rules to identify different temporal spans of the set of video clips to be included within the video edit such that the first set of rules includes a first rule used to identify a first temporal span of the first video clip to be included within the video edit and the second set of rules includes a second rule used to identify a second temporal span of the first video clip different from the first temporal span to be included within the video edit;
    based on user selection of the first story theme, automatically, and without additional user selection further defining the video edit, generate the video edit based on the one or more moments of interest within the individual video clips and the first set of rules for automatically generating the video edit; and
    based on user selection of the second story theme, automatically, and without additional user selection further defining the video edit, generate the video edit based on the one or more moments of interest within the individual video clips and the second set of rules for automatically generating the video edit, the video edit generated based on the second set of rules different from the video edit generated based on the first set of rules.

2. The system of claim 1, wherein the first moment of interest within the first video clip is identified based on a user-initiated identification of the first moment of interest.

3. The system of claim 2, wherein the user-initiated identification of the first moment of interest is provided during capture of the first video clip or post capture of the first video clip.

4. The system of claim 1, wherein the one or more physical processors are, to generate the video edit based on the user selection of the first story theme, further configured by the machine-readable instructions to:
  identify a first segment of the first video clip, the first segment being associated with the first moment of interest, the first segment comprising a temporal span of the first video clip based on the first rule of the first set of rules;
  identify a second segment of the second video clip, the second segment being associated with the second moment of interest, the second segment comprising a temporal span of the second video clip based on the first rule of the first set of rules;
  provide the first segment as a first video portion of the video edit; and provide
  the second segment as a second video portion of the video edit.

5. The system of claim 4, wherein the one or more physical processors are, to provide the first segment as the first video portion of the video edit, further configured by the machine-readable instructions to change a temporal length of one or both of the first segment or the first video portion such that that the first segment and the first video portion have the same temporal length.

6. The system of claim 5, wherein:
  the first set of rules and the second set of rules include different rules for selection of supplemental audio to be added to the video edit such that the first set of rules includes a third rule used to select first supplemental audio to be added to the video edit and the second set of rules includes a fourth rule used to select second supplemental audio different from the first supplemental audio to be added to the video edit; and
  the one or more physical processors are, to generate the video edit based on the user selection of the first story theme, further configured by the machine-readable instructions to provide the first supplemental audio to replace or add to audio of one or both of the first video clip or the second video clip in the video edit based on the third rule of the first set of rules.

7. The system of claim 6, wherein:
the first set of rules and the second set of rules include different rules for synchronization of the supplemental audio to be added to the video edit such that the first set of rules includes a fifth rule used to synchronize a transition between an end of the first video portion of the video edit and a start of the second video portion of the video edit with the supplemental audio and the second set of rules includes a sixth used to synchronize the transition differently between the end of the first video portion of the video edit and the start of the second video portion of the video edit with the supplemental audio; and
the one or more physical processors are, to provide the supplemental audio based on the user selection of the first story theme, further configured by the machine-readable instructions to synchronize the transition between the end of the first video portion of the video edit and the start of the second video portion of the video edit with the first supplemental audio based on fifth rule of the first set of rules.

8. The system of claim 7, wherein the supplemental audio comprises a song, and the synchronization of the transition between the end of the first video portion and the start of the second video portion of the video edit with the supplemental audio comprises a synchronization of the transition with a beat of the song.

9. The system of claim 7, wherein the supplemental audio comprises a song, and the synchronization of the transition between the end of the first video portion and the start of the second video portion of the video edit with the supplemental audio comprises a synchronization of the transition with an orchestrated transition of the song.

10. The system of claim 6, wherein quantities and lengths of video portions of the video edit are determined based on the supplemental audio.

11. A method of generating videos from video clips, the method being implemented in a computer system comprising one or more physical processor and storage media storing machine-readable instructions, the method comprising:
identifying one or more moments of interest within individual video clips of a set of video clips for generating a video edit, the set of video clips comprising a first video clip and a second video, including identifying a first moment of interest within the first video clip and a second moment of interest within the second video clip:
providing story themes for user selection, wherein individual ones of the story themes are defined by different sets of rules for automatically generating the video edit, the story themes including a first story theme and a second story theme different from the first story theme, the first story theme defined by a first set of rules for automatically generating the video edit and the second story theme defined by a second set of rules for automatically generating the video edit, the first set of rules being different from the second set of rule, the first set of rules and the second set of rules including different rules to identify different temporal spans of the set of video clips to be included within the video edit such that the first set of rules includes a first rule used to identify a first temporal span of the first video clip to be included within the video edit and the second set of rules includes a second rule used to identify a second temporal span of the first video clip different from the first temporal span to be included within the video edit;
based on user selection of the first story theme, automatically, and without additional user selection further defining the video edit, generating the video edit based on the one or more moments of interest within the individual video clips and the first set of rules for automatically generating the video edit; and
based on user selection of the second story theme, automatically, and without additional user selection further defining the video edit, generating the video edit based on the one or more moments of interest within the individual video clips and the second set of rules for automatically generating the video edit, the video edit generated based on the second set of rules different from the video edit generated based on the first set of rules.

12. The method of claim 11, wherein identifying the first moment of interest within the first video clip is based on a user-initiated identification of the first moment of interest.

13. The method of claim 12, wherein the user-initiated identification of the first moment of interest is provided during capture of the first video clip or post capture of the first video clip.

14. The method of claim 11, wherein generating the video edit comprises based on the user selection of the first story theme:
identifying a first segment of the first video clip, the first segment being associated with the first moment of interest, the first segment comprising a temporal span of the first video clip based on the first rule of the first set of rules;
identifying a second segment of the second video clip, the second segment being associated with the second moment of interest, the second segment comprising a temporal span of the second video clip based on the first rule of the first set of rules;
providing the first segment as a first video portion of the video edit; and
providing the second segment as a second video portion of the video edit.

15. The method of claim 14, wherein providing the first segment as the first video portion of the video edit comprises changing a temporal length of one or both of the first segment or the first video portion such that that the first segment and the first video portion have the same temporal length.

16. The method of claim 15, wherein:
the first set of rules and the second set of rules include different rules for selection of supplemental audio to be added to the video edit such that the first set of rules includes a third rule used to select first supplemental audio to be added to the video edit and the second set of rules includes a fourth rule used to select second supplemental audio different from the first supplemental audio to be added to the video edit; and
generating the video edit based on the user selection of the first story theme further comprises providing the first supplemental audio to replace or add to audio of one or both of the first video clip or the second video clip in the video edit based on the third rule of the first set of rules.

17. The method of claim 16, wherein
the first set of rules and the second set of rules include different rules for synchronization of the supplemental audio to be added to the video edit such that the first set of rules includes a fifth rule used to synchronize a transition between an end of the first video portion of the video edit and a start of the second video portion of the video edit with the supplemental audio and the second set of rules includes a sixth used to synchronize the transition differently between the end of the first video portion of the video edit and the start of the second video portion of the video edit with the supplemental audio; and providing the supplemental audio based on the user selection of the first story theme comprises synchronizing the transition between the end of the first portion of the video edit and the start of the second portion of the video edit with the first supplemental audio based on fifth rule of the first set of rules.

18. The method of claim 17, wherein the supplemental audio comprises a song, and wherein synchronizing the transition between the end of the first video portion and the start of the second video portion of the video edit with the supplemental audio comprises synchronizing the transition with a beat of the song.

19. The method of claim 17, wherein the supplemental audio comprises a song, and the synchronization of the transition between the end of the first video portion and the start of the second video portion of the video edit with the supplemental audio comprises a synchronization of the transition with an orchestrated transition of the song.

20. The method of claim 16, wherein quantities and lengths of video portions of the video edit are determined based on the supplemental audio.

* * * * *